United States Patent
Romig et al.

(10) Patent No.: US 11,061,384 B2
(45) Date of Patent: Jul. 13, 2021

(54) METHODS, APPARATUS, AND SYSTEMS TO FACILITATE MULTI-CHANNEL ISOLATION

(71) Applicant: Texas Instruments Incorporated, Dallas, TX (US)

(72) Inventors: Matthew David Romig, Wylie, TX (US); Mayank Garg, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/692,674

(22) Filed: Nov. 22, 2019

(65) Prior Publication Data
US 2021/0157299 A1    May 27, 2021

(51) Int. Cl.
*G05B 19/414*    (2006.01)

(52) U.S. Cl.
CPC ............... *G05B 19/4144* (2013.01); *G05B 2219/34236* (2013.01)

(58) Field of Classification Search
CPC ............... G05B 19/4144; G05B 2219/34236
USPC ................................ 318/562, 560
See application file for complete search history.

(56) References Cited

U.S. PATENT DOCUMENTS

| 7,675,444 B1* | 3/2010 | Smith | H04L 25/4904 |
| | | | 341/141 |
| 9,972,196 B2* | 5/2018 | Mueck | G08C 17/06 |

\* cited by examiner

*Primary Examiner* — David Luo
(74) *Attorney, Agent, or Firm* — Michelle F. Murray; Charles A. Brill; Frank D. Cimino

(57) ABSTRACT

Methods, systems, and apparatus to facilitate multi-channel isolation is disclosed. An example apparatus includes a multiplexer including a first input terminal, a second input terminal, and an output terminal; a modulator including an input terminal and an output terminal, the input terminal of the modulator coupled to the output terminal of the multiplexer; an isolation capacitor including a first terminal and a second terminal, the first terminal of the isolation capacitor coupled to the output terminal of the modulator; a first receiver die coupled to the second terminal of the isolation capacitor; and a second receiver die coupled to the second terminal of the isolation capacitor.

20 Claims, 13 Drawing Sheets

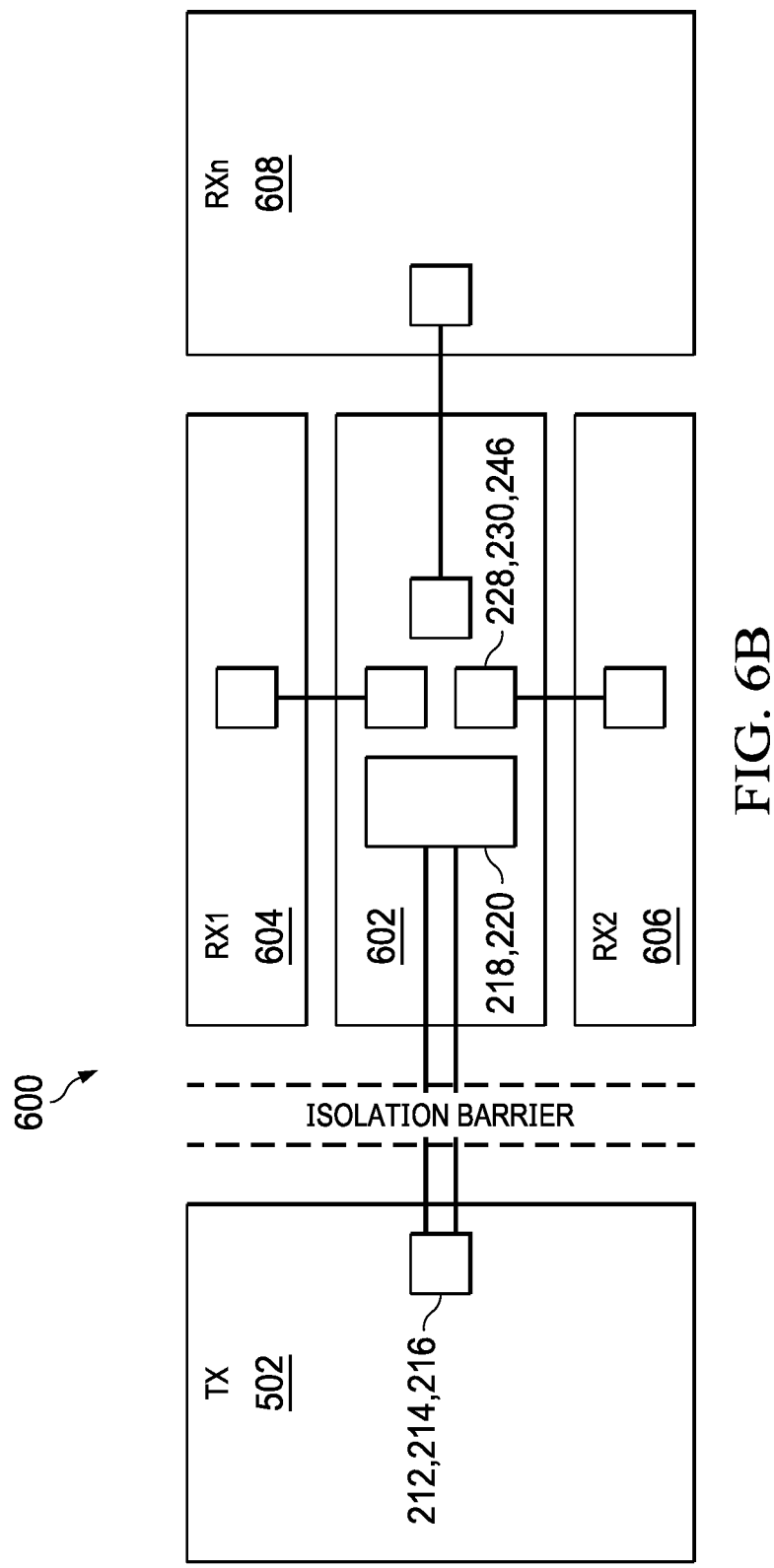

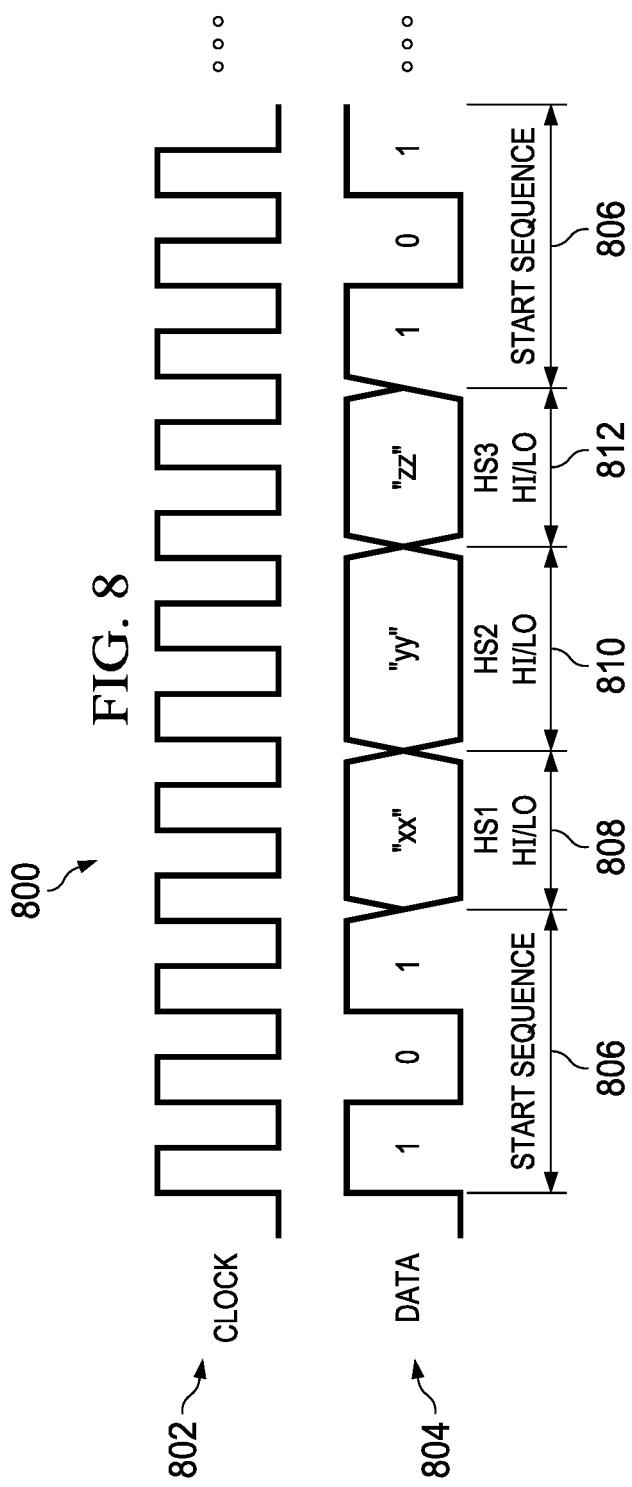

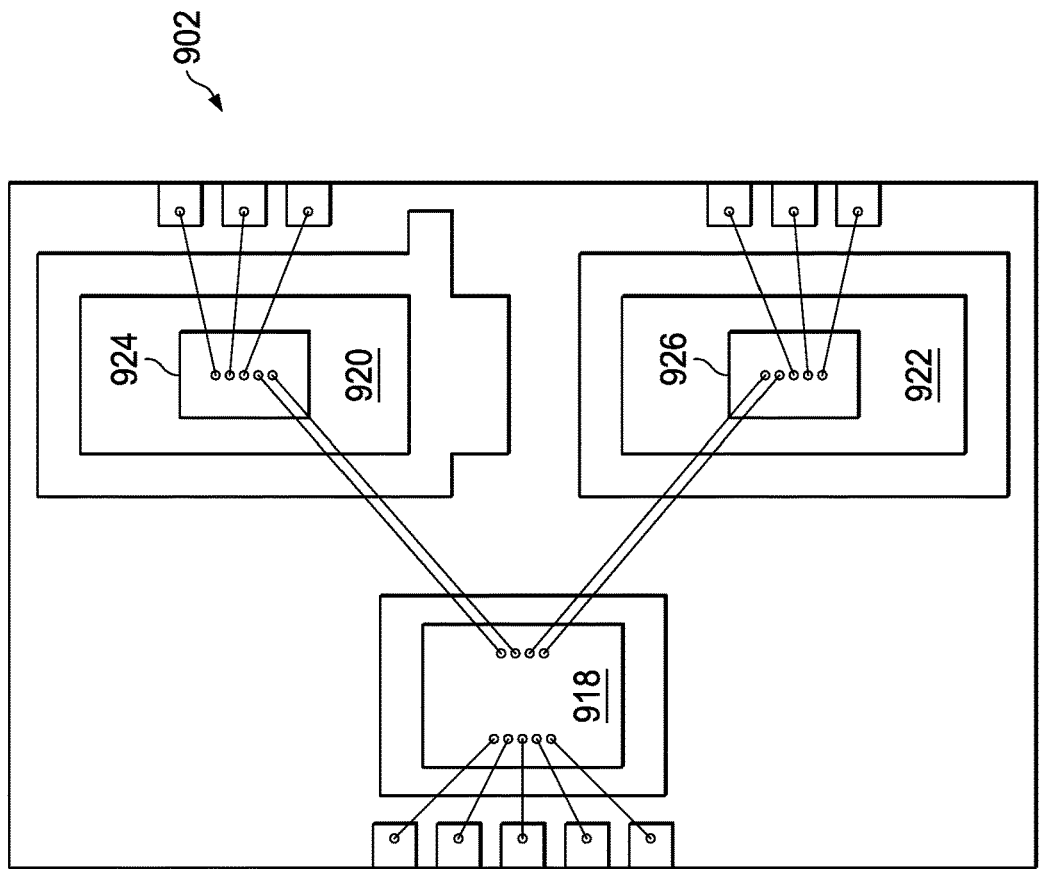
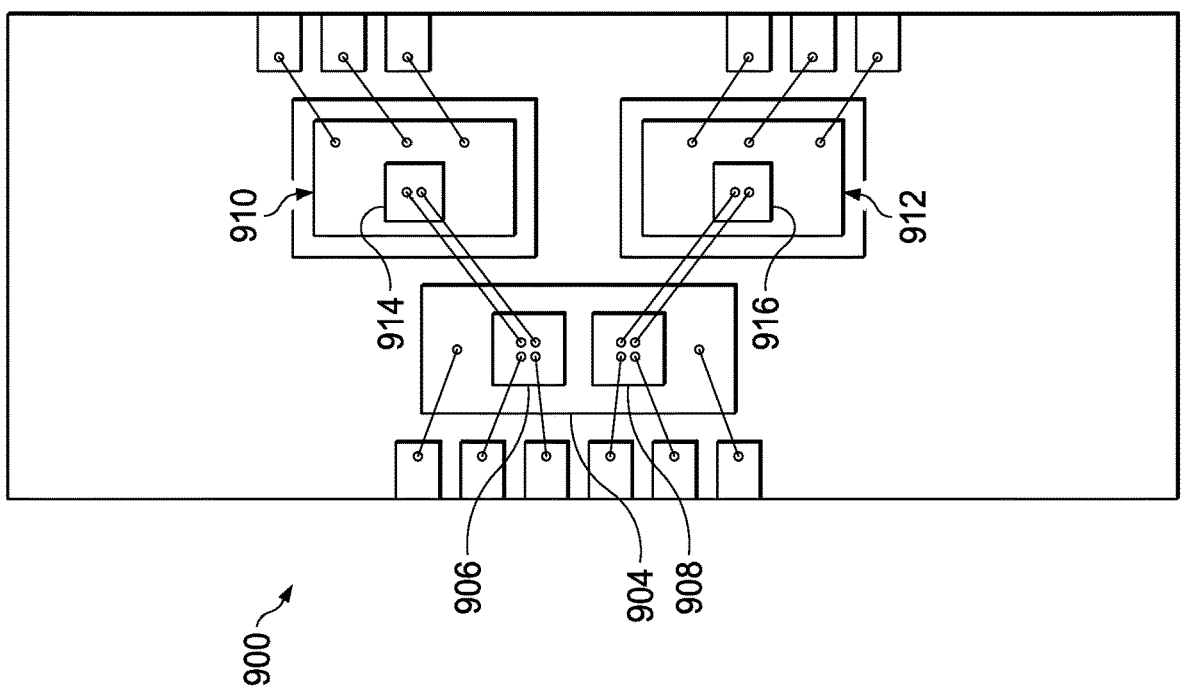
FIG. 9

METHODS, APPARATUS, AND SYSTEMS TO FACILITATE MULTI-CHANNEL ISOLATION

FIELD OF THE DISCLOSURE

This disclosure relates generally to isolation devices and, more particularly, to methods, apparatus, and systems to facilitate multi-channel isolation.

BACKGROUND

An isolation device allows signals to be transmitted between first and second parts of a circuit while the first and second parts are not connected ohmically. An isolation device includes an isolation layer implemented with, for example, a capacitive isolation barrier, an inductive isolation barrier, an optocoupled isolation barrier, and/or any other suitable isolation barrier. An isolation device may be used to protect low-voltage sections of a circuit from high-voltage sections of a circuit while allowing communication (e.g., transmission of signals) between the two sections.

SUMMARY

Certain examples disclosed herein facilitate multi-channel isolation. An example apparatus includes a multiplexer including a first input terminal, a second input terminal, and an output terminal; a modulator including an input terminal and an output terminal, the input terminal of the modulator coupled to the output terminal of the multiplexer; an isolation capacitor including a first terminal and a second terminal, the first terminal of the isolation capacitor coupled to the output terminal of the modulator; a first receiver die coupled to the second terminal of the isolation capacitor; and a second receiver die coupled to the second terminal of the isolation capacitor.

BRIEF DESCRIPTION OF THE DRAWINGS

FIGS. 6A and 6B illustrate an alternative example isolation package in conjunction with examples disclosed herein.

FIG. 8 illustrates an example timing diagram representative of a clock signal and a data signal corresponding to the isolation packages of FIGS. 2A-6B.

FIG. 9 illustrates two example isolation packages.

DETAILED DESCRIPTION

Figure 1:
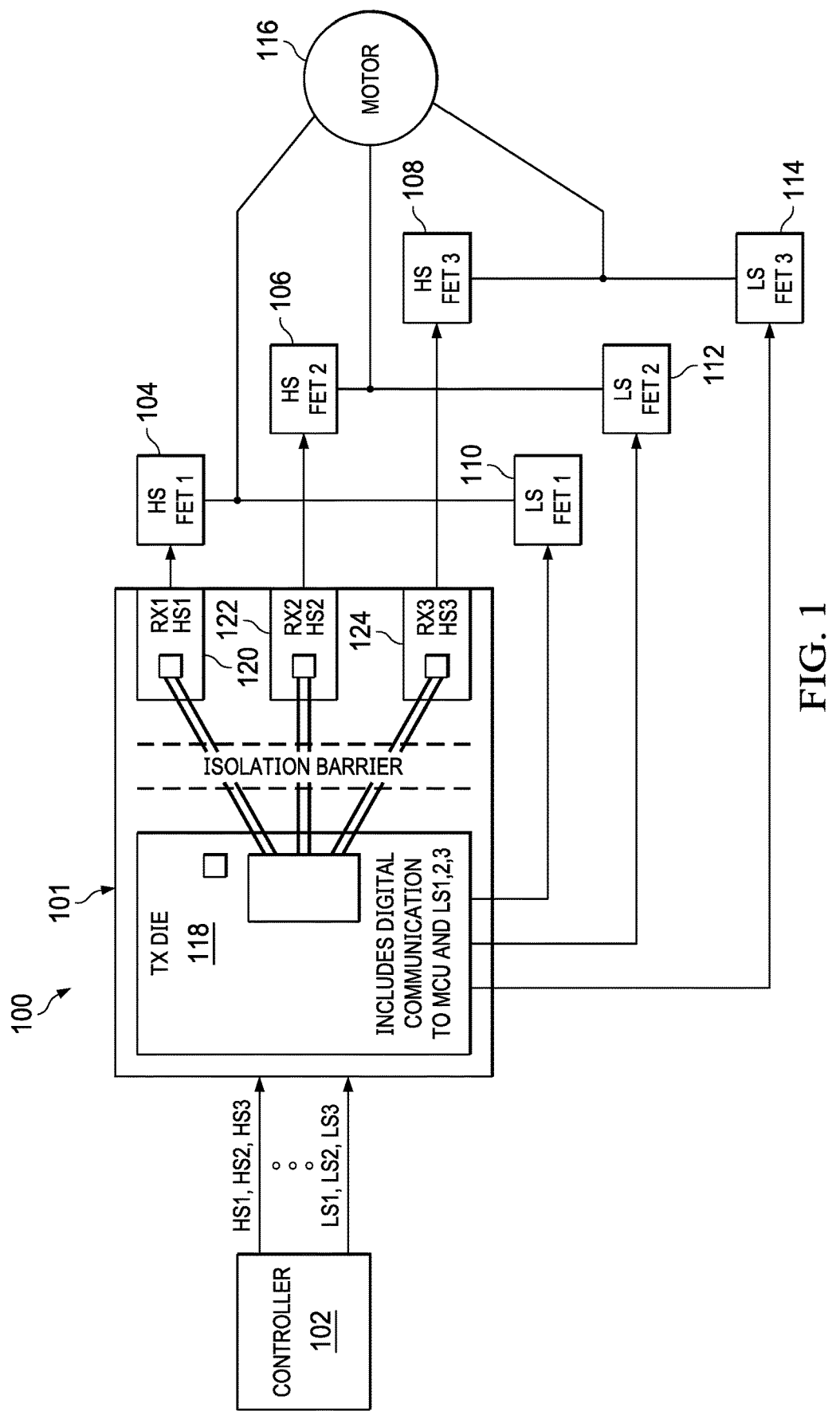
FIG. 1 illustrates an example system implementing an isolation package in conjunction with examples disclosed herein.

The figures are not to scale. Wherever possible, the same reference numbers will be used throughout the drawing(s) and accompanying written description to refer to the same or like parts. As used herein, coupled and/or connected include both direct and indirect coupling and/or connections. For example, a first device coupled to a second device includes the first device being directly coupled and/or connected to the second device or indirectly coupled and/or connected to the second device (e.g., with one or more component being coupled between the first and second devices).

Descriptors "input," "output," "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

Isolation devices (e.g., galvanic isolation devices) are used in a variety of systems to ohmically isolate two or more parts of the system while allowing the parts of the system to communicate (e.g., for signal transfer and/or power transfer operations). For example, isolation devices may be used as isolated gate drivers to control high-voltage power switches (e.g., metal oxide semiconductor field effect transistors (MOSFETs), insulated-gate bipolar transistors (IGBTs), gallium nitride (GaN) transistors, silicon carbide (SiC) transistors, etc.) in various environments and applications. In this manner, a controller at a lower voltage part of the system can transmit control signals to a higher voltage part of the system to control a high-voltage power switch while the lower voltage part is protected from the high voltages of the high voltage part. Likewise, the higher voltage part of the system can transmit feedback signals to the controller without damaging the lower voltage part of the system. Isolation devices may be used in motor control systems, one or more power supply systems of traction inverters in multi-chip module (MCM) packaging, an electric vehicle (EV), charging stations for EV, inverters in a hybrid-electric vehicle (HEV), solar inverters, telecom systems, network power systems, and etc.

High-voltage isolation devices transfer signals through isolation barriers. Isolation barriers may be implemented by capacitive isolation technology, inductive isolation technology, optocoupled isolation technology, or any other suitable isolation technology to facilitate signal and/or power transfer between parts of a system. For example, an isolation device may include a transmitter transmitting differential signals (e.g., modulated carrier signals) across the capacitive isolation barrier, and a receiver receiving the transmitted differential signals. As used herein, a carrier wave and/or carrier signal refers to a modulated signal (e.g., a modulated sinusoidal signal, a modulated square wave signal, etc.) carrying a message at a certain frequency (e.g., 20 GHz). The differential signals may then be demodulated by a receiver to retrieve the message.

Implementing an isolation device separates two stages (e.g., parts) of a system (e.g., a transmitter stage and a receiver stage). The two stages (e.g., a first stage including a transmitter die and a second stage including one or more receiver dies) of the system are connected via an isolation capacitor. The isolation capacitor provides a safety to protect humans and/or equipment from high voltage(s). When a system includes one transmitter transmitting data signals (e.g., control signals) to one receiver, the transmitter includes a modulator to modulate the data signal into a carrier signal that is transmitted to the receiver via the isolation capacitor (ISOCAP). However, when a system includes a transmitter sending different data signals to multiple receivers (e.g., to control different transistors in the receiver stage(s)), each of the signals needs to pass through an isolation capacitor to provide the safety protection. In some examples, multiple ISOCAPs are included in the system (e.g., at least one ISOCAP for each receiver) to provide the safety functionality. However, such examples correspond to increased die area, increase complexity (e.g., additional ISOCAPs increase the probability of defects leading to failures), increase cost, and loss of reliability and performance. Examples disclosed herein provide a system that facilitates communication of a serial data signal (e.g., corresponding to multiple data signals organized in series intended for multiple receivers) from a transmitter to multiple receivers without using an ISOCAP for each of the receivers, thereby reducing the die area, decreasing complexity, decreasing cost, and increasing reliability and performance of isolation circuitry.

FIG. 1 is an example system 100 (e.g., an electric motor control) including an example isolation package 101, an example controller 102, example high side switches 104, 106, 108, example low side switches 110, 112, 114, and an example motor 116. The example isolation package 101 includes an example transmitter die 118 and example receiver dies 120, 122, 124. The example controller 102 may be connected to the example switches 104, 106, 108, 110, 112, 114 via any of the example isolation packages 300, 400, 500, 600, 700 of FIGS. 3A-6B. Although the example system 100 includes three receiver dies 120, 122, 124 transmitting signals to three high side switches 104, 106, 108 and three low side switches 110, 112, 114 (e.g., for three-phase control), the example system 100 may be implemented with any number of receiver dies and/or switches.

In the example system 100 of FIG. 1, the example controller 102 of the low power stage (e.g., the example controller 102 and the example TX die 118) controls (e.g., using a control signal such as a pulse width modulation (PWM) signal(s)) example high-voltage power switch(es) 104, 106, 108 (e.g., control metal oxide semiconductor field effect transistors (MOSFETs), insulated-gate bipolar transistors (IGBTs), gallium nitride transistors, silicon carbide transistors, etc.) of the high power stage (e.g., including the high-voltage power switch(es) 104, 106, 108) by transmitting a PWM signal to the gate terminals the how power switch(es) 104, 106, 108 via the example isolation package 101. Additionally, the example controller 102 of the low power stage controls the example low-voltage power switch(es) 110, 112, 114 (e.g., control metal oxide semiconductor field effect transistors (MOSFETs), insulated-gate bipolar transistors (IGBTs), gallium nitride transistors, silicon carbide transistors, etc.) of the low power stage by transmitting a PWM signal to the gate terminals the how power switch(es) 104, 106, 108 via the example isolation package 101 without passing through the isolation barrier (e.g., corresponding an ISOCAP).

The example isolation package 101 of FIG. 1 includes the example transmission die 118 and the example receiver dies 120, 122, 124 that are communicatively coupled and electronically isolated via one or more capacitors or other isolation component. Because there are three receiver dies 120, 122, 124, some isolation packages include one or more capacitors for each data signal corresponding to control of each of the switches 104, 106, 108. However, because the example transmitter die 118 does not need to occupy all three channels (e.g., corresponding to gates of the example switches 104, 106, 108) simultaneously (e.g., the example switches 104, 106, 108 are not controlled at the same time), the example isolation package 101 can combine the three data signals and transmit to the corresponding data signal to the respective switches 104, 106, 108 via the example receiver dies 120, 122, 124. For example, the example transmitter die 118 converts three control signals (e.g., a first control signal for the first switch 104, a second control signal for the second switch 106, and a third control signal for the third switch 108) into a signal serial signal that is converted into a carrier wave that can pass through the isolation barrier (e.g., one or more capacitors), which can be filtered by the example receiver dies 120, 122, 124 so that the example switches 104, 106, 108 obtain their corresponding control signal, as further described below. In this manner, the example controller 102 can transmit three control signals for three phase control of the example motor 116 using the example high side switches 104, 106, 108 while being isolated from high voltage corresponding to the high side switches 104, 106, 108. As further described below, the example isolation package 101 may include a single isolation capacitor (e.g., for the data line to the receivers 120, 122, 124) as part of the transmitter die 118, one of the receiver dies 120, 122, 124, and/or as a stand-alone component on either one of the transmitter side or the receiver side.

The example isolation package 101 in the system 100 of FIG. 1 provides reinforced reliability and safety insulation capacity for gate driving, current/voltage sensing, digital communication, etc. The example isolation package 101 provides a safety isolation barrier between high-voltage section (e.g., stage) and the low-voltage section (e.g., stage). The example isolation package 101 includes the example transmitter die 118 to transmit data (e.g., control signals) to the gate terminals of the example low side switches 110, 112, 194 and the example receivers 120, 122, 124 to transmit control signals to the example high side switches 104, 106, 108 to control the example motor 116. For example, the high side switches 104, 106, 108 have first current terminals coupled to a second first current terminal of the low side switches 110, 112, 114 and the example motor 116. Additionally, the high side switches 104, 106, 108 include a second current terminal coupled to a high voltage source. The low side switches 110, 112, 114 include second current terminals coupled to ground. Additionally, the first stage may provide voltage and/or current information to the example controller 105 via other components such as voltage sensors and/or current sensors. As further described below, the example isolation package 101 could be implemented by any one or and/or any combination of the isolation packages, 200, 300, 400, 500, 600, 700 of FIGS. 2A-7B.

Figure 2A:
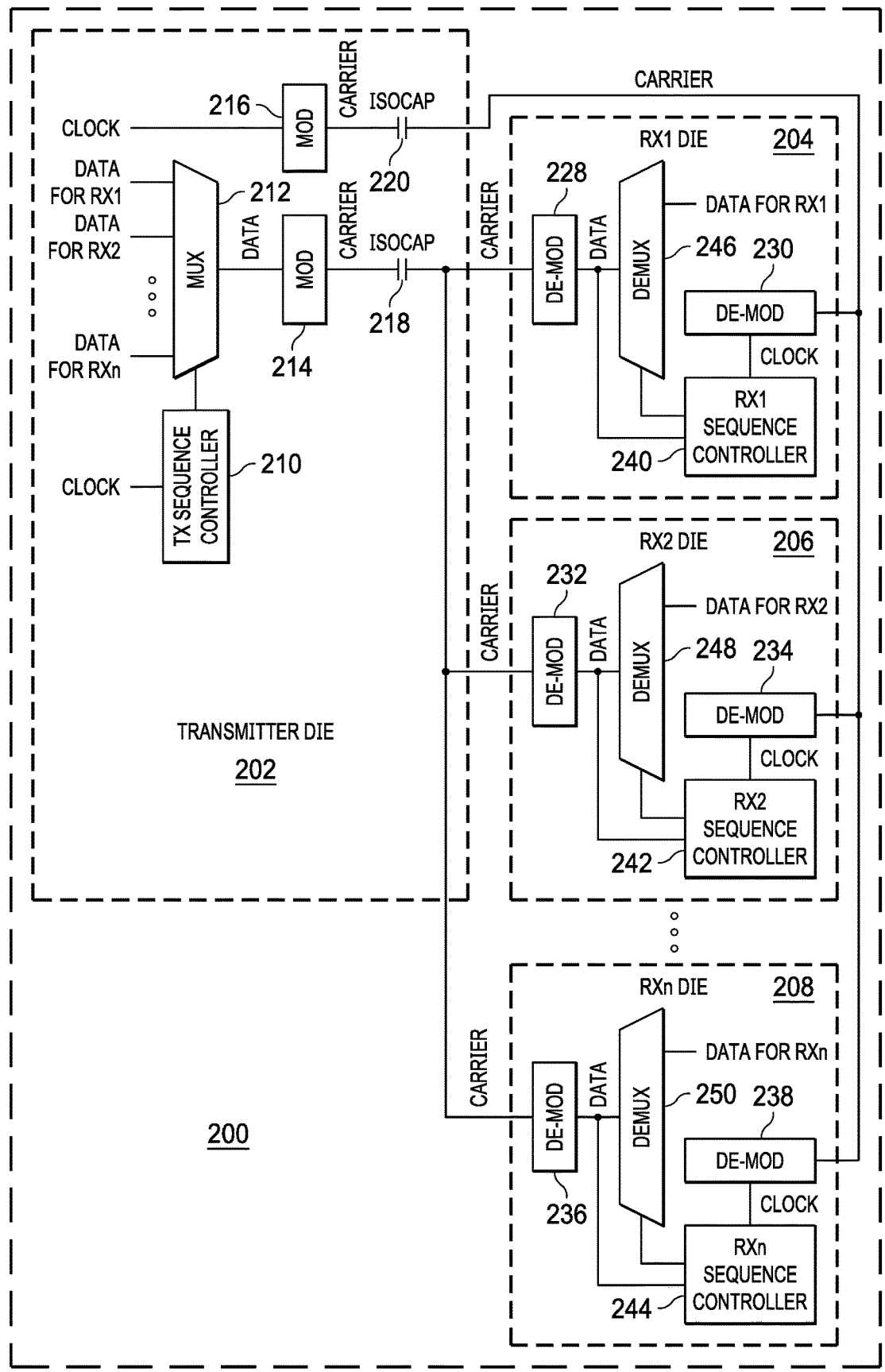
FIGS. 2A and 2B illustrate an example isolation package in conjunction with examples disclosed herein.

FIG. 2A illustrates an example isolation package 200 that may be used to implement the example isolation package 101 of FIG. 1. The example isolation package 200 of FIG. 2A includes an example transmitter die 202 and example receiver dies 204, 206, 208. The transmitter die 202 includes an example transmission (TX) sequence controller 210, an example multiplexer (MUX) 212, example modulators 214, 216, and example isolation capacitors (ISOCAPs) 218, 220 (e.g., corresponding to an isolation barrier). The example receiver dies 204, 206, 208 include example demodulators 228, 230, 232, 234, 236, 238, example receiver (RX) sequence controllers 240, 242, 244, and example demultiplexers (DEMUX) 246, 248, 250. Although the example isolation package 200 includes three receiver dies 204, 206, 208, the example isolation package 200 can include any number of receiver dies. The example isolation package 200 is a device, component, product, and/or multi-chip modulate that includes the example transmitter die 202, and receiver dies 204, 206, 208 in a co-package as a single apparatus which can be connected into an end system, such as the system 100 of FIG. 1.

The example TX sequence controller 210 of FIG. 2A includes an input coupled to a clock generator and an output coupled to the select terminal of the example MUX 212. In some examples, the output of the TX sequence controller 210 may be multiple output lines. The example TX sequence controller 210 receives a clock signal and generates a sequence to control the MUX 212 for switching between the data signals (e.g., data for RX1, data for RX2, data for RXn) intended for the receivers 204, 206, 208. For example, the sequence controller 210 may select the data for the example receiver 204 to be output by the example MUX 212 for three clock cycles, followed by the data for the example receiver 206 for three clock cycles, etc. Accordingly, the output of the example MUX 212 is a series data signal that corresponds to the data signals for the receivers 204, 206, 208 at different groups of cycles. As further described below, the order of switching and/or the number of clock cycles per receiver is known by the example RX sequence controllers 240, 242, 244. In this manner, the receivers 204, 206, 208 can identify which part of the received serial data signal correspond to data intended for the particular receiver 204, 206, 208.

The example MUX 212 of FIG. 2A includes inputs to received data to be sent to the example receivers 204, 206, 208 (e.g., a first input for the first receiver 204, a second input for the second receiver 206, an nth input for the nth receiver 208). In some examples, the MUX 212 may include an input that is dedicated to a starting sequence (e.g., send from a controller or other device). The starting sequence is output when data transmission is to initiate, as further described below in conjunction with FIG. 8. The inputs may be coupled to a controller, microprocessor, and/or other device that transmits data to the example receivers 204, 206, 208 via the ISOCAP 218. The example MUX 212 further includes one or more select inputs coupled to the output of the example TX sequence controller 210 (e.g., the number of select inputs corresponds to $\log_2(n)$, where n is the number of inputs). For example, if the MUX 212 included to inputs for two data signals, the MUX 212 would include one select input, if the MUX 212 included 4-8 data inputs, the MUX 212 would include two select inputs, etc. The example MUX 212 includes one output coupled to the input of the example modulator 214.

The example MUX 212 of FIG. 2A outputs the data signals as a serial data signal (e.g., the data for RX1 204 at a first time, the data for RX2 206 at a second time, etc.) based on the value at the select input. For example, if the MUX 212 has two select inputs and the TX sequence controller 210 outputs a zero to the first select input of the MUX 212 and a one to the second select input of the MUX 212, the MUX 212 is configured to output the data at the first data input (e.g., the data for RX1 204). In such an example, if the TX sequence controller 210 outputs a one to the first select input of the MUX 212 and a zero to the second select input of the MUX 212, the MUX 212 will output the data at the second data input (e.g., the data for RX2 206). Accordingly, the output (e.g., the serial data signal) of the MUX 212 corresponds to a serial data representation of the data for the respective receivers 204, 206, 208. An example serial data signal output of the MUX 212 is further described below in conjunction with FIG. 8. In some examples, the MUX 212 may be multiple MUX circuitry to handle any number of inputs.

The example modulator 214 of FIG. 2A includes an input terminal and an output terminal, the input terminal is coupled to the output of the MUX 212 and the output terminal is coupled to the example ISOCAP 218. The example modulator 216 of FIG. 2A includes an input terminal and an output terminal, the input terminal being couple to a clock signal generator (e.g., via a clock node) and the output terminal coupled to the example ISOCAP 220.

The example modulators 214, 216 of FIG. 2A convert an input signal (e.g., a clock signal for the modulator 216 and the serial data signal for the modulator 214) into a small amplitude modulated signal carrier representative of the respective input signal. For example, the modulators 214, 216 may modulate (e.g., convert) signals using an on-off keying (OOK)-based modulation scheme and/or any other modulation scheme. The signal carriers correspond to the input data. For example, the modulator 214, 216 may output a carrier signal for a preset duration of time when the clock/serial data signal corresponds to a '1' and the modulator 214, 216 may output a 0V AC signal for the preset duration of time when the clock/serial data signal corresponds to a '0.' In this manner, when one or more of the example receiver dies 204, 206, 208 receives the carrier signal (e.g., from the outputs of the modulators 214, 216 via the example capacitors 218, 220), the receiver dies 204, 206, 208 can demodulate the carrier signals to identify the clock/serial data signal of '1' and when the receiver dies 204, 206, 208 do not receive the carrier signals (e.g., corresponding to a 0V AC signal), the receivers 204, 206, 208 can demodulate the 0V AC signal to identify the clock/serial data signal of '0.'

The example ISOCAP 218 of FIG. 2A includes two terminals. The first terminal of the ISOCAP 218 is coupled to an output of the modulator 214 of the transmitter die 202 and the second terminal of the ISOCAP 218 is coupled to the demodulators 228, 232, 236 of the example receiver dies 204, 206, 208. The example ISOCAP 220 includes two terminals. The first terminal of the ISOCAP 220 is coupled to the output of the modulator 216 of the transmitter die 202 and the second terminal of the ISOCAP 220 is coupled to the example demodulators 230, 234, 238 of the example receiver dies 204, 206, 208.

The example ISOCAPs 218, 220 of FIG. 2A allow carrier signal outputs of the modulators 214, 216 to be transmitted from the transmitter die 202 to the receiver dies 204, 206, 208. Additionally, the ISOCAPs 218, 220 isolate (e.g., separate) a first stage (e.g., a low-voltage stage) of a system coupled to the input of the transmitter die 202 to a second stage (e.g., a high-voltage stage) of the system coupled to the output of the receiver dies 204, 206, 208. However, because the isolation barrier provides AC coupling, the modulated signal carriers pass through the ISOCAPs 218, 220 to the receiver 204. Although the isolation layer of FIG. 2A is implemented by the example ISOCAPs 218, 220, the isolation layer may be implemented as an inductive isolation barrier, an optocoupled isolation barrier, or any other suitable isolation barrier.

The example ISOCAPs 218, 220 of FIG. 2A enable signal and/or power transfer between two parts of a system while preventing transfer of DC and unwanted AC between two parts of the system. For example, the transmitter 202 can transmit a carrier signal corresponding to a data signal (e.g., a control signal) to the receivers 204, 206, 208 via the ISOCAPs 218, 220. The receivers 204, 206, 208 demodulate the carrier signal to determine the data/control signal and transmit the control signal to a component (e.g., a high-voltage power switch). However, because the ISOCAPs 218, 220 ohmically decouple the transmitter 202 from the receivers 204, 206, 208 there is no transfer of DC. In the example of FIG. 2A, the transmitter 202 is implemented in a first die, the receiver 204 is implemented in a second die, the receiver 206 is implemented in a third die, and the nth receiver 206 is implemented in an n+1th die. Each die may include the ISOCAP 218 (e.g., further examples described below). The two dies may be packed together as the isolation package 200 in a single package. Alternatively, the example isolation package 200 may be implemented as a single chip.

The example receivers 204, 206, 208 of FIG. 2A receive the carrier signal representative of the clock and the carrier signal representative of the serial data signal (e.g., control signal) from the example transmitter 202. The example demodulators 228, 230, 232, 234, 236, 238 of the receivers 204, 206, 208 of FIG. 2A include an input terminal and an output terminal. The inputs of the demodulators 228, 232, 236 are coupled to the ISOCAP 218 and the outputs of the respective demodulators 228, 232, 236 are coupled to the respective inputs of the example DEMUXs 246, 248, 250. The inputs of the demodulators 230, 234, 238 are coupled to the ISOCAP 220 and the outputs of the respective demodulators 230, 234, 238 are coupled to the respective inputs of the example DEMUXs 246, 248, 250.

The example demodulators 228, 230, 232, 234, 236, 238 of FIG. 2A convert an input carrier signal (e.g., representative of the clock signal for the demodulators 230, 234, 238 and representative of the serial data signal for the demodulators 228, 232, 236) into the serial data signal. The demodulators 228, 230, 232, 234, 236, 238 demodulate based on the modulation scheme of the example modulators 214, 216. For example, if the modulators 214, 216 modulate (e.g., convert) the signals using an on-off keying (OOK)-based modulation scheme, the demodulators 228, 230, 232, 234, 236, 238 demodulate using an OKK-based demodulation scheme. In this manner, when one or more of the example receiver dies 204, 206, 208 receives the carrier signal (e.g., from the outputs of the modulators 214, 216 via the example capacitors 218, 220), the receiver dies 204, 206, 208 can demodulate the carrier signals to identify the clock/serial data signal of '1' and when the receiver dies 204, 206, 208 do not receive the carrier signals (e.g., corresponding to a 0V AC signal), the receivers 204, 206, 208 can demodulate the 0V AC signal to identify the clock/serial data signal of '0.'

The example RX sequence controllers 240, 242, 244 of FIG. 2A include an input terminal and an output terminal. The input terminals of the RX sequence controllers 240, 242, 244 are coupled to the respective demodulators 230, 234, 238 and the output terminals of the RX sequence controllers 240, 242, 244 are coupled to the respective demultiplexers 246, 248, 250 and the respective example RX sequence controllers 240, 242, 244.

The example RX sequence controllers 240, 242, 244 of FIG. 2A receive the clock signal from the example transmitter 202 via the example demodulator 230. The example RX sequence controllers 240, 242, 244 use the received clock signal from the example transmitter 202 to synchronize with the example TX sequence controller 210. As described above, the order of switching and/or the number of clock cycles per receiver used by the example TX sequence controller 210 is known by the example RX sequence controllers, 240, 242, 244. Initially, the example RX sequence controller 240, 242, 244 may wait for a start sequence on the data signal to determine that data transmission has been initiated. Once transmission has been initiated, the example RX sequence controllers 240, 242, 244 identify which part of the received data signal corresponds to data intended for the particular receiver 204, 206, 208. In this manner, the RX sequence controllers 240, 242, 244 can output one or more signals to the select input of the respective example DEMUXs 246, 248, 250 to ensure that the DEMUX 246, 248, 250 outputs data corresponding to the respective receiver 204, 206, 208. For example, using the clock signal and the sequence information corresponding to how the TX sequence controller 210 controls the MUX 212 to generate the data signal, the example RX1 sequence controller 240 outputs a signal to the select input of the example DEMUX 246 to ensure that the DEMUX 246 outputs the data for the RX1 204 and discard or otherwise ignore data indented for the other receivers.

The example DEMUXs 246, 248, 250 of FIG. 2A include an input terminal, one or more select terminals, and one or more output terminals. The input terminal of the DEMUXs 246, 248, 250 are coupled to the respective demodulators 228, 232, 236. The one or more select inputs are coupled to the output of the respective example RX sequence controllers 240, 242, 244 (e.g., the number of select inputs corresponds to $\log_2(n)$, where n is the number of inputs). The output corresponding to the data for the respective receiver is structured to be coupled to an output component (e.g., a filter, preprocessing circuitry, an amplifier, a gate of a high power transistor, etc.), controller, microprocessor, and/or any other circuitry. For example, the first output of the example DEMUX 246 of the first receiver die 204 is coupled to output circuitry, the second output of the example DEMUX 248 of the second receiver die 206 is coupled to output circuitry, etc. In some examples, the other outputs of the DEMUXs 246, 248, 250 (e.g., the second, third, . . . , nth output of the DEMUX 246; the first, third, . . . , nth output of the DEMUX 248; etc.) are not utilized (e.g., not coupled to the output circuitry). In this manner, the example DEMUX 246 operates as a filter to filter out the data that does not correspond to the respective receiver 204, 206, 208. In some examples, one or more of the DEMUXs 246, 248, 250 could be replaced by a filter to filter out data that corresponds to a difference receiver based on the data sequence. In some examples, the DEMUXs 246, 248, 250 may be multiple DEMUX circuitry to handle any number of outputs.

The example DEMUXs 246, 248, 250 of FIG. 2A receives the serial data signal (e.g., the data for RX1 204 at a first clock cycle(s), the data for RX2 206 at a second clock cycle(s), etc.) and extracts and outputs the data corresponding to the respective receiver 204, 206, 208. For example, when the current clock cycle(s) for the data signal correspond to data for the first receiver die 204, the example sequence controller 240 outputs one or more control signals to the one or more select inputs of the example DEMUX 246 to output the data for first receiver die 204. In such an example, when the current clock cycle(s) for the data signal correspond to data for the second receiver die 206, the RX1 sequence controller 240 outputs one or more control signals to discard the data signal while the example RX2 sequence controller 242 outputs one or more control signals to the select terminals of the example DEMUX 248 so that the DEMUX 248 outputs the data for the second receiver die 206. In this manner, the receiver 204 extracts, from the input serial data signal, and outputs the data for the receiver 204, the receiver 206 extracts, from the input serial data signal, and outputs the data for the receiver 206, etc.

Figure 2B:
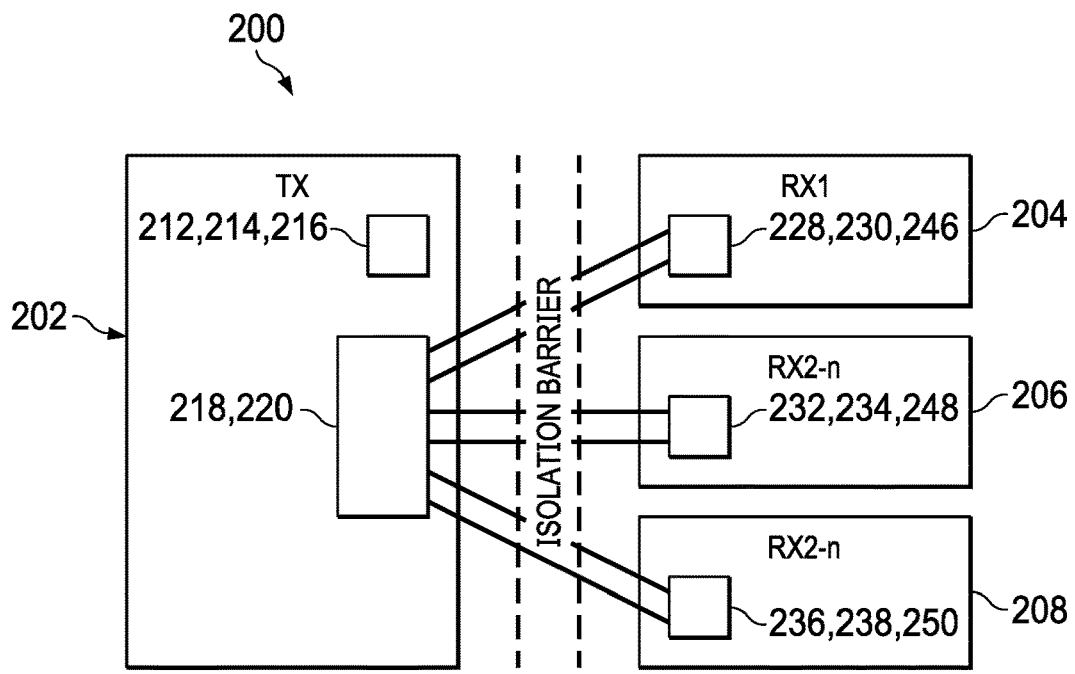

In some example multi-channel isolation circuits, an isolation capacitor is used in each receiver for each data signal, as further described below in conjunction with FIG. 9. However, the example isolation package 200 of FIG. 2A utilizes the components of FIG. 2A to convert the multiple data signals into a single serial data signal at the transmitter side, pass to the receivers via one isolation capacitor, and convert the serial data signal back into the multiple data signals on the receiver side, thereby conserving die area, reducing complexity, and reducing cost. FIG. 2B illustrates an example physical instantiation of the layout of the example isolation package 200 of FIG. 2A.

Figure 3B:
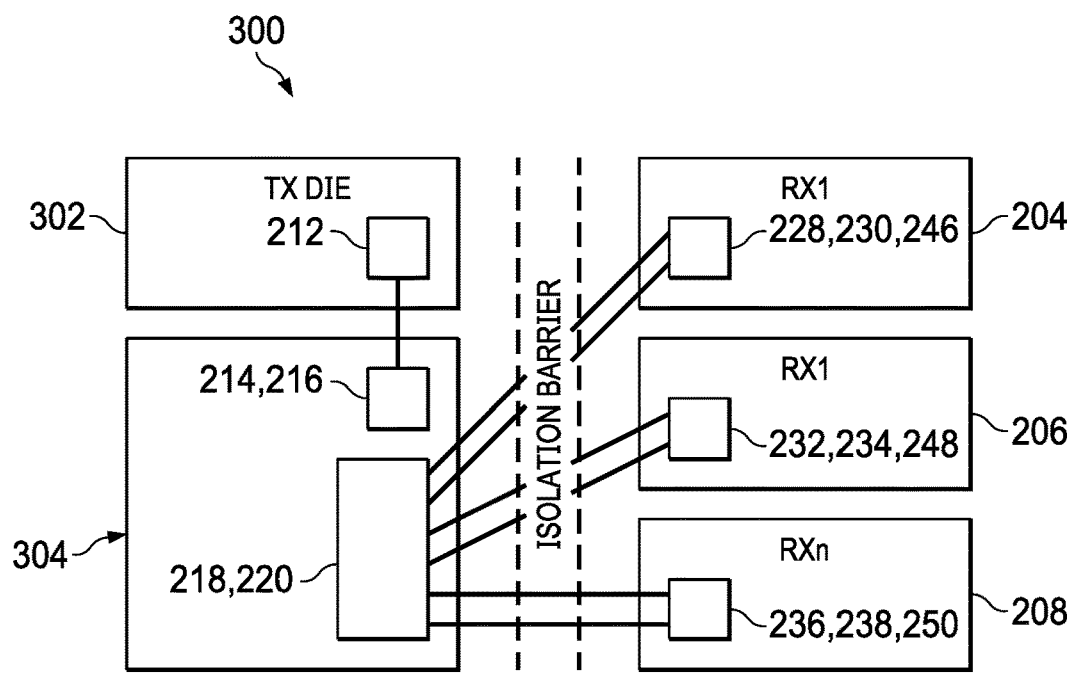
FIGS. 3A and 3B illustrate an alternative example isolation package in conjunction with examples disclosed herein.
Figure 3A:
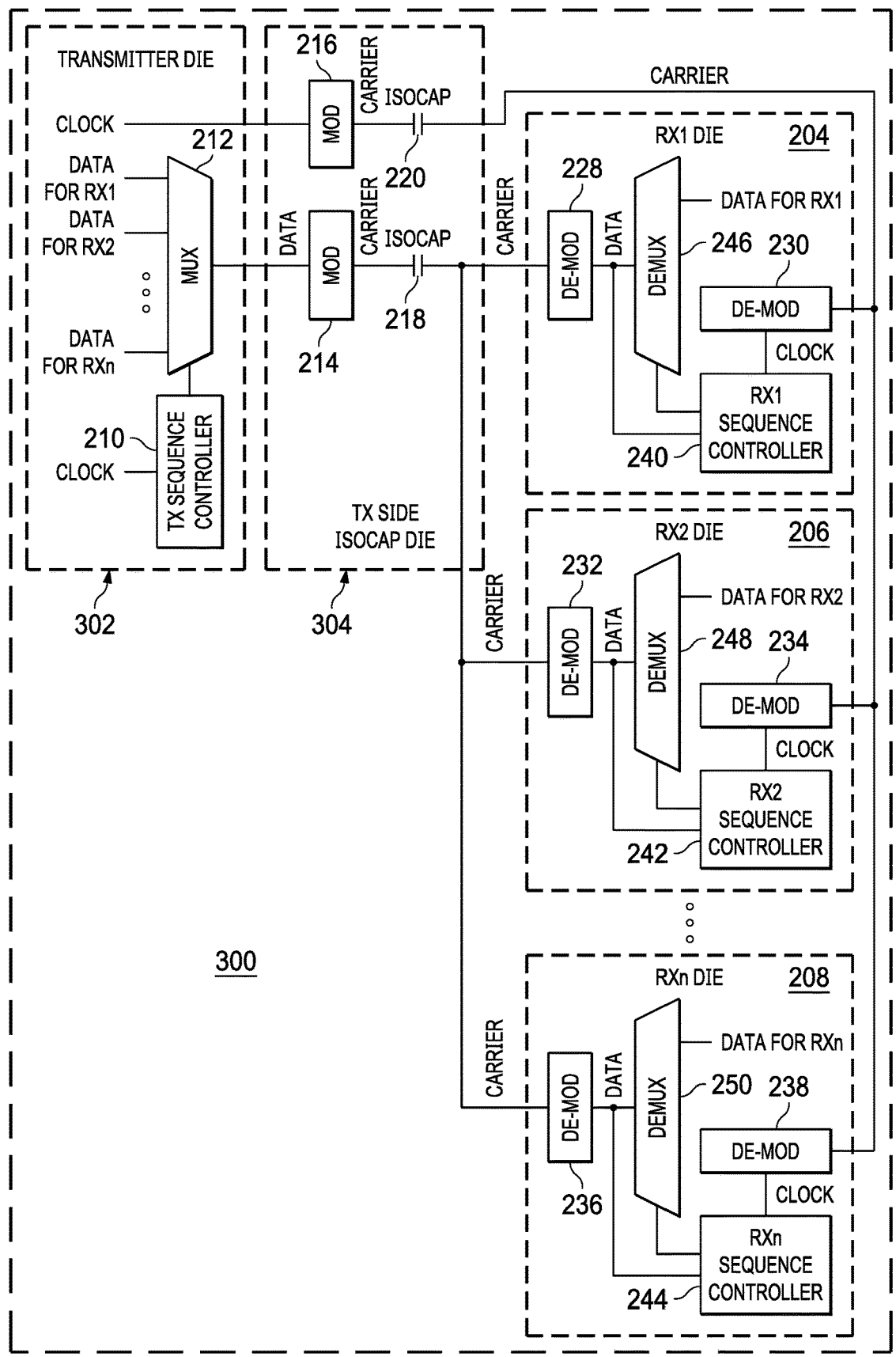

FIG. 3A illustrates an alternative example isolation package 300 that may implement the example isolation package 101 of FIG. 1. The example isolation package 300 includes an example transmitter die 302, an example transmitter side ISOCAP die 304, and example the receiver dies 204, 206, 208 of FIG. 2A. The transmitter die 302 includes the example transmission (TX) sequence controller 210 and the example multiplexer (MUX) 212 of FIG. 2A. The example TX-side transmitter ISOCAP die 304 includes the example modulators 214, 216 and the example isolation capacitors (ISOCAPs) 218, 220 of FIG. 2A. The example receiver dies 206, 206, 208 include the example demodulators 228, 230, 232, 234, 236, 238, the example receiver (RX) sequence controllers 240, 242, 244, and the example demultiplexers (DEMUX) 246, 248, 250. Although the example isolation package 300 of FIG. 3A includes three receiver dies 204, 206, 208, the example isolation package 300 can include any number of receiver dies. The example isolation package 300 is a device, component, product, and/or multi-chip modulate that includes the example transmitter die 202, the receiver dies 204, 206, 208, and the transmitter side ISOCAP die 304 in a co-package as a single apparatus which can be connected into an end system, such as the system 100 of FIG. 1.

In the example of FIG. 3A, the transmitter die 202, the TX side ISOCAP die 304, and the receiver dies 204, 206, 208 are implemented in separate dies. The dies may be packed together as the isolation package 300 in a single package. Alternatively, the example isolation package 300 may be implemented as a single chip. Because the modulators 214, 216 and the ISOCAPs 218, 220 are implemented in the example TX side ISOCAP die 304, the transmitter die 302 can concentrate the resources to the components of the transmitter die 302 without using resources to implement the components of the TX side ISOCAP die 304. The example components of the isolation package 300 operate in the same manner as described in conjunction with FIG. 2A. FIG. 3B illustrates an example physical instantiation of the layout of the example isolation package 300 of FIG. 3A.

Figure 4A:
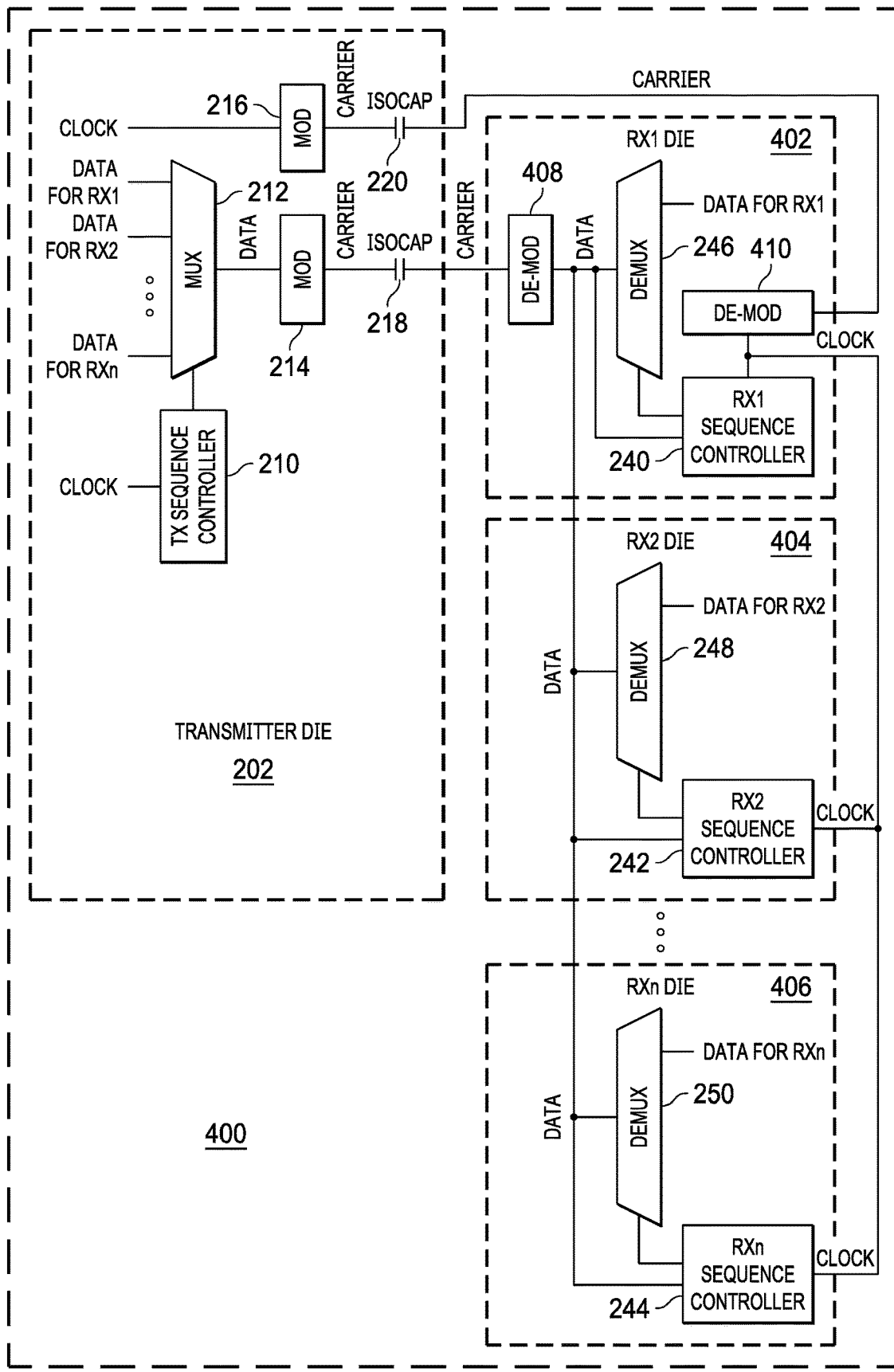
FIGS. 4A and 4B illustrate an alternative example isolation package in conjunction with examples disclosed herein.

FIG. 4A illustrates an alternative example isolation package 400 that may implement the example isolation package 101 of FIG. 1. The example isolation package 400 includes an example transmitter die 202 of FIG. 2A and example receiver dies 402, 404, 406. The transmitter die 202 includes the example transmission (TX) sequence controller 210, the example multiplexer (MUX) 212, the example modulators 214, 216 and the example isolation capacitors (ISOCAPs) 218, 220 of FIG. 2A. The example receiver die 402 includes the example receiver (RX) sequence controller 240 and the DEMUX 246 of FIG. 2A. The example receiver die 402 further includes an example demodulators 408, 410. The example receiver dies 404, 406 include the example RX sequence controllers 242, 244 and the example DEMUXs 248, 250 of FIG. 2A. Although the example isolation package 400 of FIG. 4A includes three receiver dies 402, 404, 406, the example isolation package 400 can include any number of receiver dies. The example isolation package 400 is a device, component, product, and/or multi-chip modulate that includes the example transmitter die 202 and the receiver dies 402, 404, 406 in a co-package as a single apparatus which can be connected into an end system, such as the system 100 of FIG. 1.

In the example isolation package 400 of FIG. 4A, the first example receiver die 402 includes the example demodulator 408. The demodulator 408 operates in the same manner as the example demodulator 228 of FIG. 2A. However, the output terminal of the demodulator 408 is coupled to the input terminal of the example DEMUX 248 of the second example receiver die 404 and the input terminal of the example DEMUX 250 of the nth example receiver die 406. In this manner, the demodulator 408 demodulates the carrier data signal into the data signal and transmits the data signal to the DEMUXs of the receivers (e.g., as opposed to including a separate demodulator for each receiver). Although the example isolation package 400 illustrates the output of the demodulator 408 being coupled to the nth receiver 406 via the second receiver 404, the output of the demodulator 408 may be coupled to each receiver die directly or indirect (e.g., via one or more other receivers).

Figure 4B:
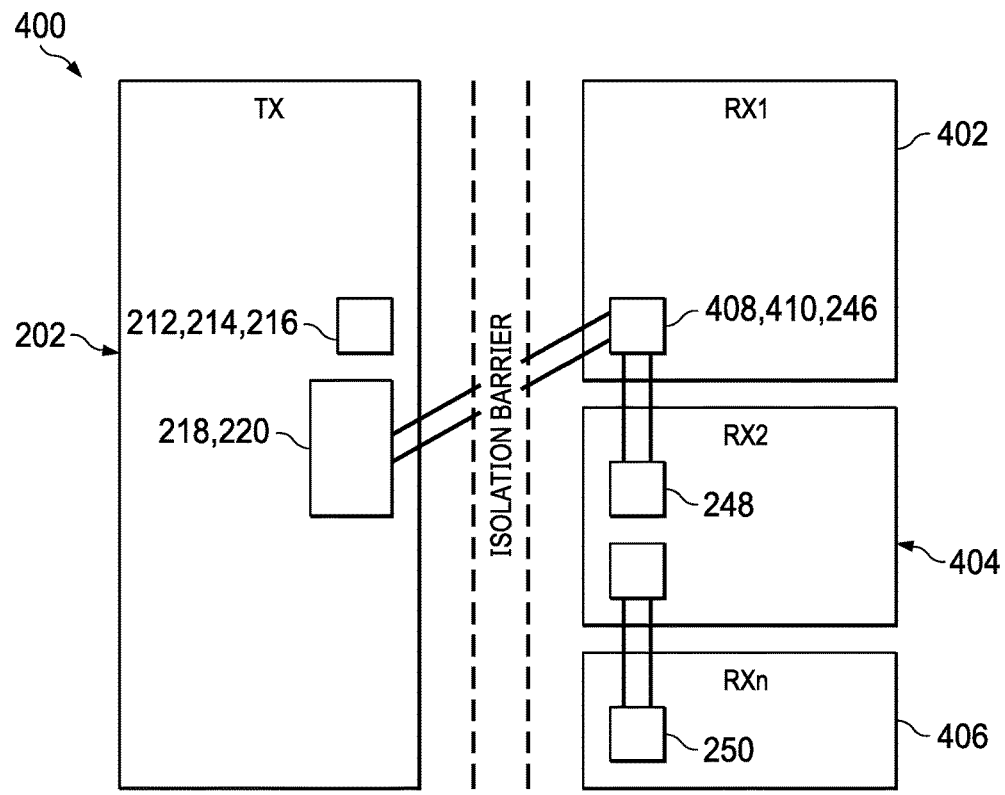

In the example isolation package 400 of FIG. 4A, the first example receiver die 402 includes the example demodulator 410. The demodulator 410 operates in the same manner as the example demodulator 230 of FIG. 2A. However, the output terminal of the demodulator 410 is coupled to the input terminal of the example RX2 sequence controller 242 in the second example receiver die 404 and the input terminal of the example RXn sequence controller 244 of the nth example receiver die 406. In this manner, the demodulator 410 demodulates the clock carrier signal (e.g., clock-based carrier signal) into the clock signal and transmits the clock signal to the RX sequence controllers of the receivers (e.g., as opposed to including a separate demodulator for each receiver). Although the example isolation package 400 illustrates the output of the demodulator 410 being coupled to the $3^{rd}$ receiver 404 and the nth receiver 406 directly, the output of the demodulator 408 may be coupled to each receiver die directly or indirect (e.g., via one or more other receivers). FIG. 4B illustrates an example physical instantiation of the layout of the example isolation package 400 of FIG. 4A.

Figure 5B:
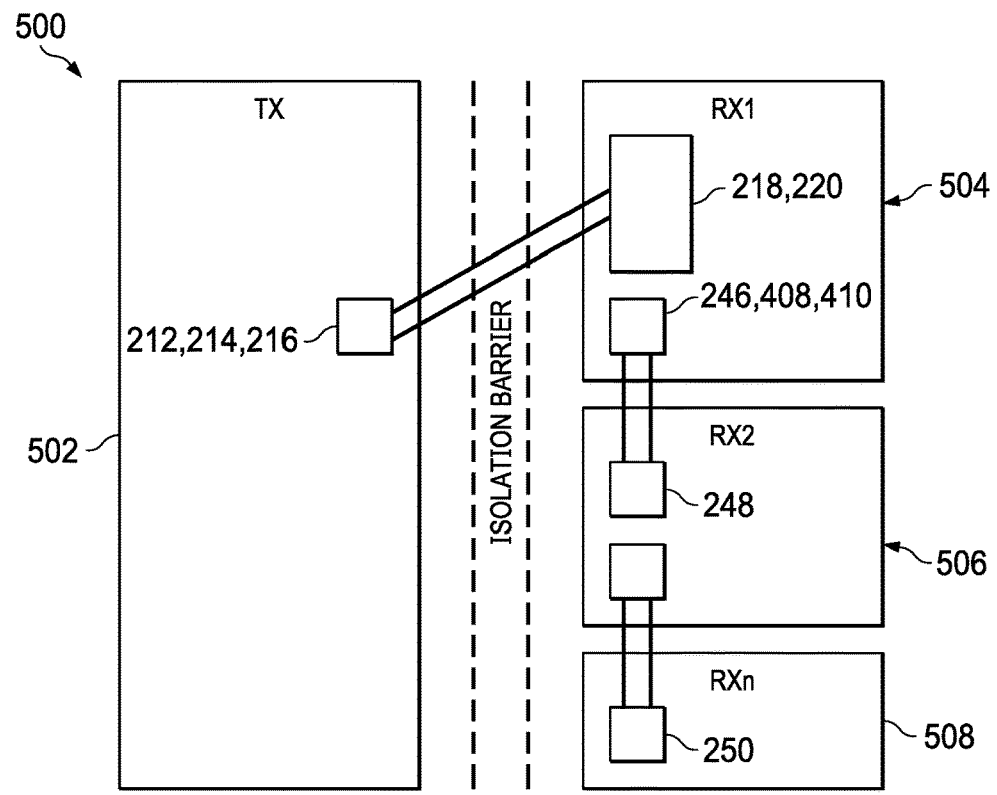
FIGS. 5A and 5B illustrate an alternative example isolation package in conjunction with examples disclosed herein.
Figure 5A:
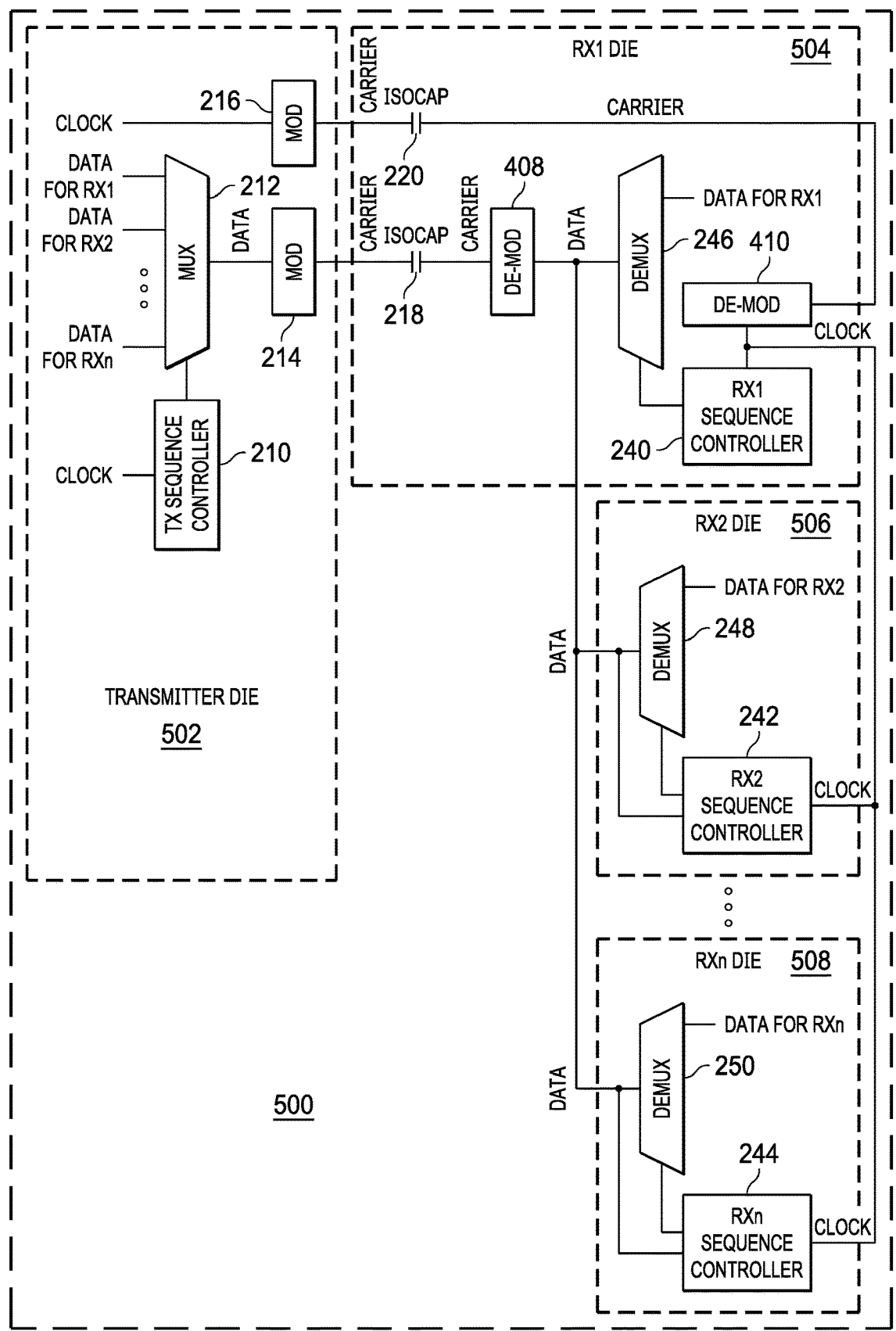

FIG. 5A illustrates an alternative example isolation package 500 that may implement the example isolation package 101 of FIG. 1. The example isolation package 500 includes an example transmitter die 502 and example receiver dies 504, 506, 508. The transmitter die 502 includes the example transmission (TX) sequence controller 210, the example multiplexer (MUX) 212, and the example modulators 214, 216 of FIG. 2A. The example receiver die 504 includes the example isolation capacitors (ISOCAPs) 218, 220, the example receiver (RX) sequence controller 240 and the DEMUX 246 of FIG. 2A. The example receiver die 504 further includes the example demodulators 408, 410 of FIG. 4A. The example receiver dies 506, 508 include the example RX sequence controllers 242, 244 and the example DEMUXs 248, 250 of FIG. 2A. Although the example isolation package 500 of FIG. 4A includes three receiver dies 504, 506, 508, the example isolation package 500 can include any number of receiver dies. The example isolation package 500 is a device, component, product, and/or multi-chip modulate that includes the example transmitter die 502 and the receiver dies 504, 506, 508 in a co-package as a single apparatus which can be connected into an end system, such as the system 100 of FIG. 1.

In the example isolation package 500 of FIG. 5A, the example ISOCAPs 218, 220 are implemented in the first example receiver die 504 on the receiver side, instead of the transmitter side 502. Accordingly, the example transmitter 502 transmits the modulated data carrier signal and modulated clock carrier signal to the first example receiver 504 via the example ISOCAPs 220, 218 on the receiver side. The example demodulators 408, 410 demodulate the carrier signal from the transmitter 502 (e.g., via the ISOCAPs 218, 220) and directly transmit the data signal and clock signal to the example receivers 506, 508. However, as described above, the demodulators 408, 410 may transmit the data/clock signal directly or indirectly to the example receiver dies 404, 406. FIG. 5B illustrates an example physical instantiation of the layout of the example isolation package 500 of FIG. 5A.

Figure 6A:
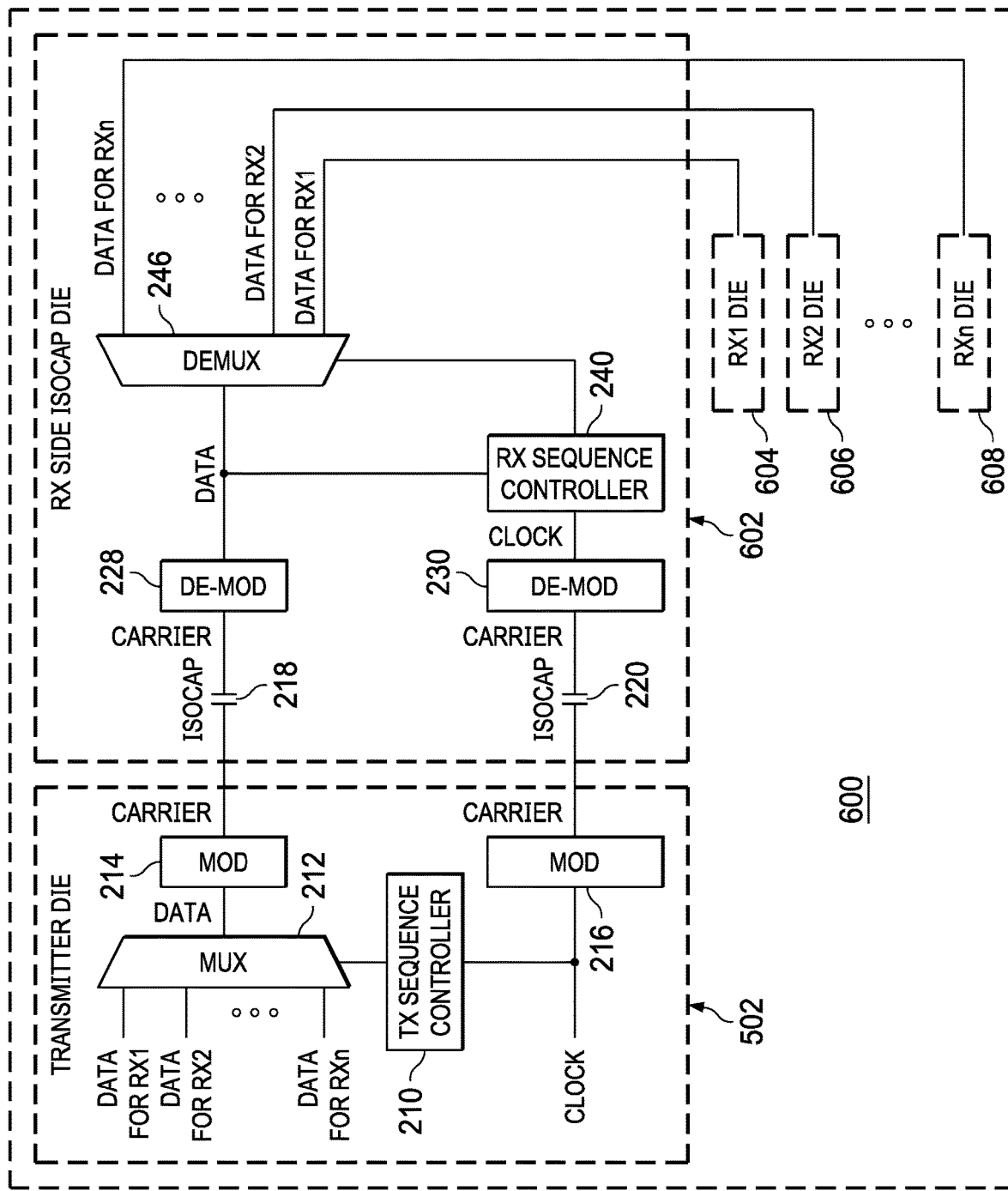

FIG. 6A illustrates an alternative example isolation package 600 that may implement the example isolation package 101 of FIG. 1. The example isolation package 600 includes the example transmitter die 502 of FIG. 5A, an example RX side ISOCAP die 602, and example receiver dies 604, 606, 608. The transmitter die 502 includes the example transmission (TX) sequence controller 210, the example multiplexer (MUX) 212, and the example modulators 214, 216 of FIG. 2A. The example RX side ISOCAP die 602 includes the example ISOCAPs 218, 220, the example demodulators 228, 230, the RX sequence controller 240, and the DEMUX 246 of FIG. 2A. The example DEMUX 246 includes a data for RX1 terminal coupled to the RX1 die 604, a data for RX2 terminal coupled to the RX2 die 606, and a data for RXn terminal coupled to the RXn die 608. Although the example isolation package 600 includes three receiver dies 604, 606, 608, the example isolation package 600 may be implemented with any number of receiver dies. The example isolation package 600 is a device, component, product, and/or multi-chip modulate that includes the example transmitter die 502, the receiver side ISOCAP die 602, and the receiver dies 604, 606, 608, in a co-package as a single apparatus which can be connected into an end system, such as the system 100 of FIG. 1.

In the example isolation package 600 of FIG. 6A, the example RX side ISOCAP die 602 includes the example ISOCAP 220 to receive the carrier signal via the example modulator 216 of the transmitter die 502. The example demodulator 230 receives the carrier signal via the example ISOCAP 220 to determine the clock signal based on the carrier signal. The clock signal is used by the example RX sequence controller 240 to determine how to adjust the select line of the example DEMUX 246 to output the correct data signal to the correct data output terminals of the example DEMUX 246.

For example, when the clock cycle(s) of the data signal corresponds to data intended for the first example RX die 604, the RX sequence controller 240 outputs one or more signals to the one or more select input terminals of the example DEMUX 246, so that the data signal received at the input (e.g., the data signal output by the example demodulator 228) of the example DEMUX 246 is passed to the corresponding RX die 604, 606, 608. In such an example, if the sequence corresponds to the first three clock cycles being reserved for the first receiver die 604, the second three clock cycles being reserved for the second receiver die 606, and the nth three clock cycles being reserved for the nth receiver die 608, the RX sequence controller 240 will output one or more signals to the select input(s) of the DEMUX 246 to output the data input to (1) the data for RX1 output terminal for the first three clock cycles, (2) the data for the RX2 output terminal for the second three clock cycles, and (3) the data for the RXn output terminal for the nth three clock cycles. Because the output terminals are coupled to the respective RX dies (e.g., data for RX1 output terminal coupled to the RX1 die 604, data for RX2 output terminal coupled to the RX2 die 606, etc.), the example RX dies each receive their respective data. As described above in conjunction with FIG. 2A, the example RX dies 604, 606, 608 may include any number and/or type of components (e.g., a filter, preprocessing circuitry, an amplifier, etc.), controller, microprocessor, and/or any other circuitry. Additionally or alternatively, the example dies, 604, 606, 608 may be an interface to pass the data signals to other circuitry. FIG. 6B illustrates an example physical instantiation of the layout of the example isolation package 600 of FIG. 6A.

Figure 7A:
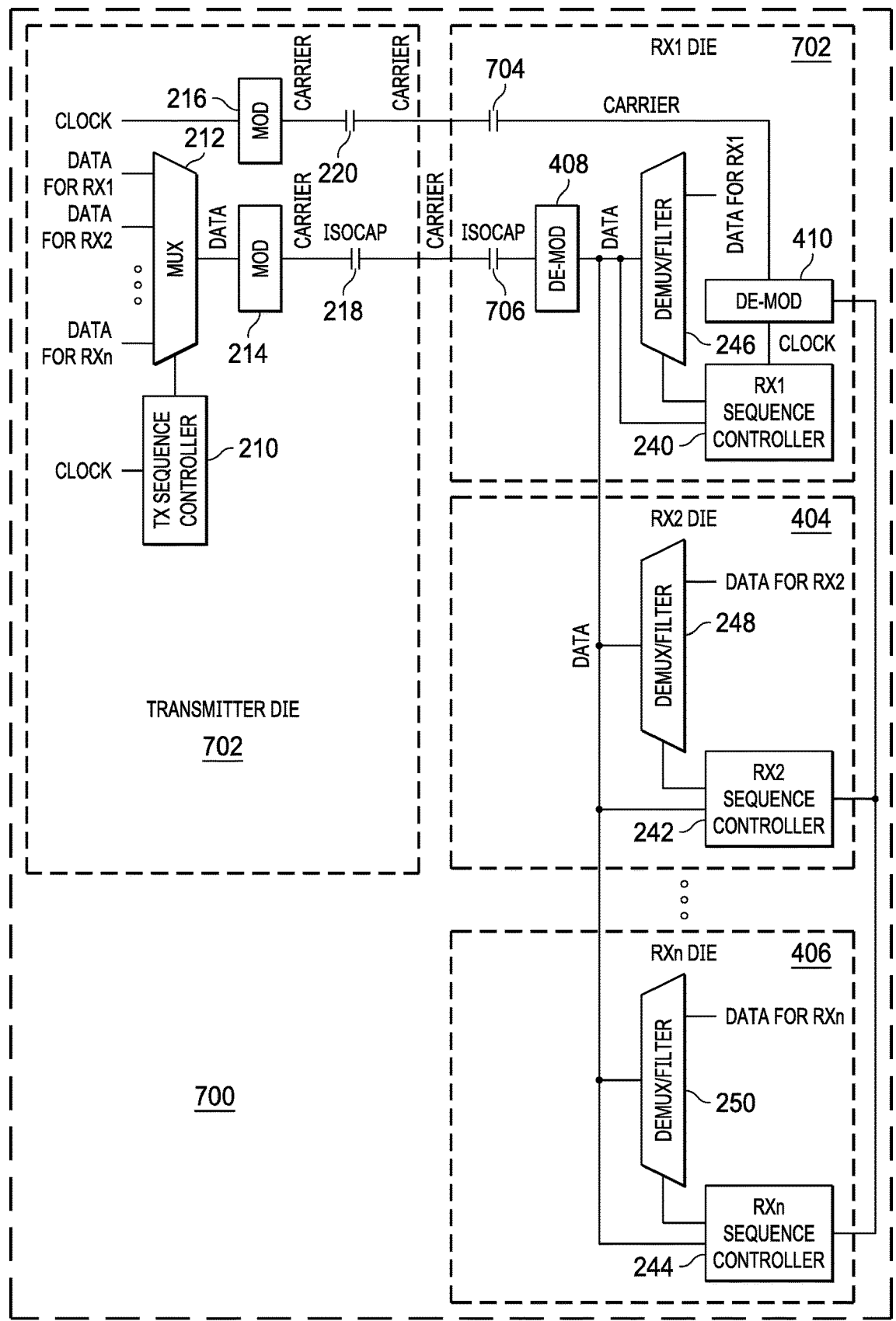
FIGS. 7A and 7B illustrate an alternative example isolation package in conjunction with examples disclosed herein.

FIG. 7A illustrates an alternative example isolation package 700 that may implement the example isolation package 101 of FIG. 1. The example isolation package 700 includes the example transmitter die 202 of FIG. 2A, the example receiver dies 404, 406 of FIG. 4A and an example receiver die 702. The transmitter die 202 includes the example transmission (TX) sequence controller 210, the example multiplexer (MUX) 212, the example modulators 214, 216 and the example isolation capacitors (ISOCAPs) 218, 220 of FIG. 2A. The example receiver die 702 includes the example receiver (RX) sequence controller 240 and the DEMUX 246 of FIG. 2A and the example demodulators 408, 410 of FIG. 4A. The example receiver die 402 further includes example ISOCAPs 706, 704. The example receiver dies 404, 406 include the example RX sequence controllers 242, 244 and the example DEMUXs 248, 250 of FIG. 2A. Although the example isolation package 700 of FIG. 7A includes three receiver dies 402, 404, 406, the example isolation package 700 can include any number of receiver dies. The example isolation package 700 is a device, component, product, and/or multi-chip modulate that includes the example transmitter die 202 and the receiver dies 404, 406, 702 in a co-package as a single apparatus which can be connected into an end system, such as the system 100 of FIG. 1.

The example isolation package 700 of FIG. 7A includes the example ISOCAPs 218, 220 on the transmitter die 202 and the example ISOCAPs 704, 706 on the receiver die 702. The first terminal of the example ISOCAP 704 is coupled to a second terminal of the example ISOCAP 220 and the second terminal of the ISOCAP 704 is coupled to the input terminal of the demodulator 410. The first terminal of the example ISOCAP 706 is coupled to a second terminal of the example ISOCAP 218 and the second terminal of the ISOCAP 706 is coupled to the input terminal of the demodulator 408. In some examples, either the ISOCAP 704 or the ISOCAP 706 may be removed. The example isolation package 700 includes ISOCAPs on both the receiver side and the transmitter side (e.g., a series ISOCAP) to provide additional voltage isolation and/or reliability and safety confidence.

Figure 7B:
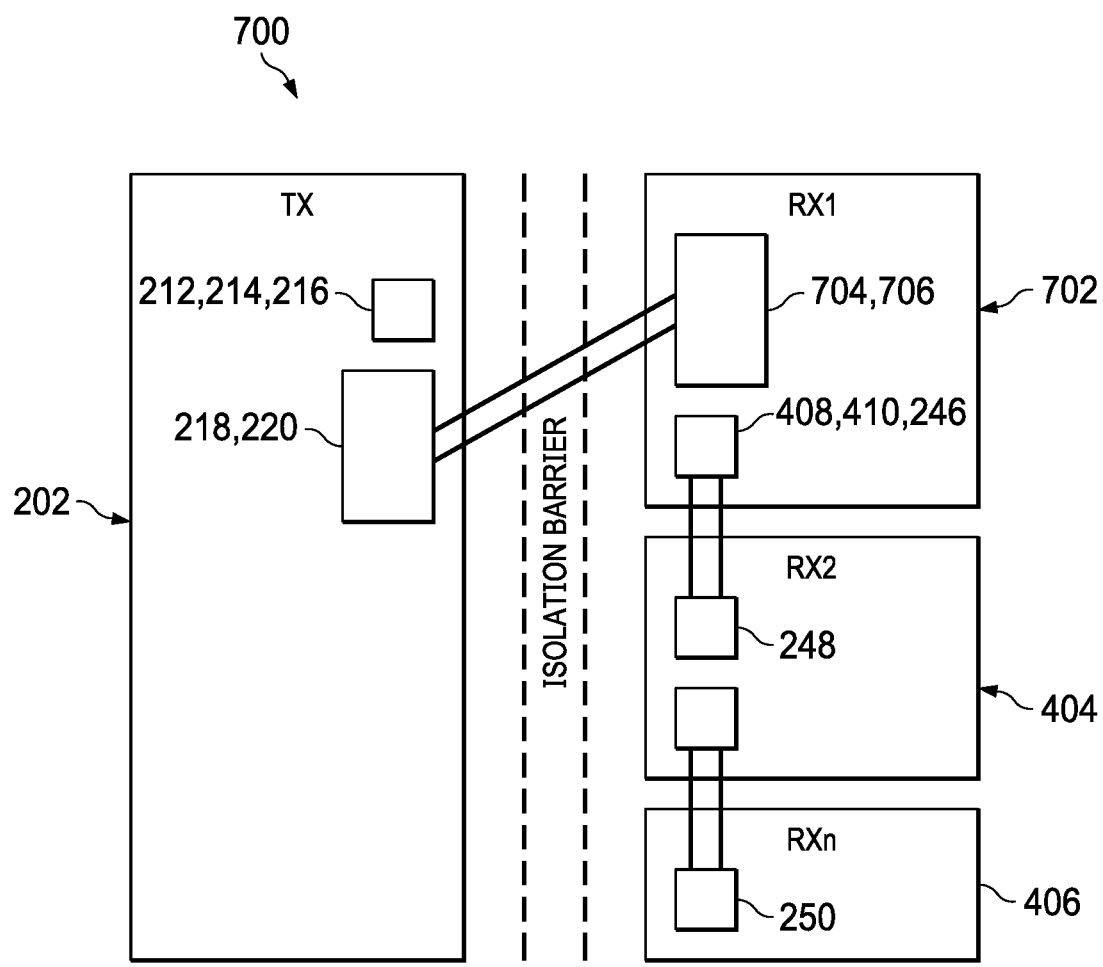

It would be appreciated that elements of FIGS. 2A-6B may be rearranged, combined, removed, or otherwise altered in different combinations based on the availability of processing power and/or space on a die. For example, the number and/or location of demodulators and/or the connection type (e.g., direct or indirect) between receivers on the receiver side may connected in any manner and/or combination of manners shown in FIGS. 2A-6B. In another example, the types of transmitter dies, transmitter side ISOCAP die, receiver die, and/or receiver side ISOCAP dies shown in FIG. 2A-6 may be rearrange and/or combined to create an alternative isolation circuit. In some examples, ISOCAPs may not be able to be combined on the same die with other types of circuitry. Accordingly, the location of and connections to the ISOCAP may be different based on the different components implemented on the receiver side and/or transmitter side dies. FIG. 7B illustrates an example physical instantiation of the layout of the example isolation package 700 of FIG. 7A.

FIG. 8 is an example timing diagram 800 illustrating an example clock signal 802 and an example data signal 804 (e.g., serial data signal). The clock signal 802 is the signal that is utilized by the example TX sequence controller 210 and RX sequence controllers 240, 242, 244 of FIGS. 2A-6B and/or modulated by the example modulator 216 of FIGS. 2A-6B (e.g., configured to control the MUX 212 and/or DEMUXs 246, 228, 250). The example data signal 804 represents the output of the example MUX 212 and the input of the example DEMUXs 246, 248, 250 of FIGS. 2A-6B. The example data signal 804 includes example start sequences 806, an example data for RX1 808, and example data for RX2 810, and an example for RXn 812.

The example data for RX1 808 corresponds to the first input of the example MUX 212 and/or the output of the DEMUX 246 for the first receiver die. The example data for RX2 810 corresponds to the second input of the example MUX 212 and/or the output of the DEMUX 248 for the second receiver die. The example data for RXn 812 corresponds to the third input of the example MUX 212 and/or the output of the DEMUX 250 for the third receiver die. Although the example data signal 804 is illustrated in FIG. 8, a different sequence may be utilized (e.g., different starting sequence, different number of cycles per receiver, different order for the receivers, etc.).

As described above, the example clock signal 802 is used by the example TX sequence controller 210 to select when the to switch from outputting data from a first receiver to a second receiver. For example, based on the example timing diagram 800, the TX sequence controller 210 selects the first data signal at the first input of the MUX 212 (e.g., corresponding to the example data for signal 808) to be output for two clock cycles, followed by selecting the second data signal at the second input of the MUX 212 to be output for two clock cycles, followed by the third data signal at the third output of the MUX 212 to be output for two clock cycles. Alternatively, the TX sequence controller 210 may be configured to select any of the input signals for any number of clock signals in any order (e.g., because the RX sequence controller 240, 242, 244 are configured in the same manner to be able to obtain the data signal corresponding to the respective receiver 204, 206, 208). Additionally, the clock signal is transmitted to the example RX sequence controller 2120, 242, 244 to synchronize with the example TX sequence controller 210. In the example timing diagram 800, the data signal 804 corresponds to transmitting data in cycles of corresponding to two clock pulses, although any number of clock pulses may be utilized. Initially, the data signal 804 starts with the start sequence 806. The start sequence 806 lets the RX sequence controllers 240, 242, 244 know that data transmission is initiating. In some examples, the start sequence 806 may be output by a component coupled to the first input of the MUX 212. In other examples, the example MUX 212 may include an input dedicated to outputting the start sequence 806 when data transmission is to initiate.

After the example start sequence 806, the example TX sequence controller 210 outputs a control signal to the select input terminal(s) of the example MUX 212 so that the example data for RX1 808 is output by the MUX 212. After two clock pulses, the example TX sequence controller 210 outputs a control signal to the select input terminal(s) of the example MUX 212 so that the example data for the RX2 810 is output by the MUX 212. After two clock pulses, the example TX sequence controller 210 outputs a control signal to the select input terminal(s) of the example MUX 212 so that the example data for the RXn 812 is output by the MUX 212. Once the cycles are complete, the data signal 804 repeats the start sequence 806 for another round of cycles.

Once the example RX sequence controllers 240, 242, 244 obtain/identify the example start sequence 806, the example RX sequence controllers 240, 242, 244 control the DEMUXs 246, 248, 250 via the select input terminals to ensure that the data for RX1 808 is output by the first RX die (e.g., to circuitry coupled to the first RX die), the data for RX2 810 is output by the second RX die, and the data for RXn 812 is output by the nth RX die.

Using the example system 100 of FIG. 1, the example controller 102 may continuously output a first PWM signal (e.g., "xx" of the data signal 804) corresponding to a first phase for the first switch 104, a second PWM signal (e.g., "yy" of the data signal 804) corresponding to a second phase for the second switch 106, and a third PWM signal (e.g., "zz" of the data signal 804) corresponding to a third phase for the third switch 108. After the example RX sequence controllers 240, 242, 244 determine that the example starting sequence 806 has been received, the example TX sequence controller 210 outputs a select signal so that the first PWM signal is output by the MUX 212. At the same time, the example RX sequence controller 240 outputs a select signal to the example DEMUX 246 so that the output of the DEMUX 246 is the first PWM signal. Additionally, the example RX sequence controllers 242, 244 control the respective DEMUXs 248, 250 so that the outputs of the respective DEMUXs 248, 250 is a low voltage (e.g., regardless of the input data signal). Accordingly, the example motor 116 is controlled based on the first PWM signal at the first phase for the first switch 104.

After two clock pulses, the example TX sequence controller 210 changes the select signal so that the example MUX 212 outputs the second PWM signal at the second phase. At the same time, the example RX sequence controller 242 outputs a select signal to the example DEMUX 248 so that the output of the DEMUX 248 is the second PWM signal. Additionally, the example RX sequence controllers 240, 244 control the respective DEMUXs 246, 250 so that the outputs of the respective DEMUXs 246, 250 is a low voltage (e.g., regardless of the input data signal). Accordingly, the example motor 116 is controlled based on the second PWM signal at the second phase for the second switch 106.

After two additional clock pulses, the example TX sequence controller 210 changes the select signal so that the example MUX 212 outputs the third PWM signal at the third phase. At the same time, the example RX sequence controller 244 outputs a select signal to the example DEMUX 250 so that the output of the DEMUX 250 is the third PWM signal. Additionally, the example RX sequence controllers 240, 242 control the respective DEMUXs 246, 248 so that the outputs of the respective DEMUXs 246, 248 is a low voltage (e.g., regardless of the input data signal). Accordingly, the example motor 116 is controlled based on the third PWM signal at the third phase for the second third switch 108.

FIG. 9 illustrates two example isolation circuits 900, 902 that include ISOCAP circuitry for data transmission for each receiver. The example isolation circuit 900 includes an transmitter die 904 including ISOCAPs 906, 908 for data transmission and example receiver dies 910, 912. The example receiver die 910 includes example ISOCAP 914 and receiver die 912 includes example ISOCAP 916. The example isolation circuit 902 includes a transmitter die 918 and receiver dies 920, 922. The receiver die 920 includes ISOCAP 924 and the receiver die 922 includes ISOCAP 926.

In the example isolation circuit 900 of FIG. 9, the transmitter 904 transmits data to the two example receivers 910, 912. The example transmitter 904 includes the ISOCAP 906 to transmit data to the receiver 910 (e.g., via the example ISOCAP 914) and the ISOCAP 908 to transmit data to the receiver 912 (e.g., via the ISOCAP 916). Accordingly, the example isolation circuit 900 uses four ISOCAPs to provide data to the two receivers 910, 912. As described above in conjunction with FIG. 7A, the isolation package 700 is able to transmit data with added voltage isolation to any number of receivers using two ISOCAPs, as opposed to the four ISOCAPs of the example isolation circuit 900. Accordingly, the isolation package 700 is less complex, smaller, and cheaper to implement than the example isolation circuit 900.

In the example isolation circuit 902 of FIG. 9, the example transmitter 918 transmits data to the two receivers 920, 922. Each receiver 920, 922 includes its own ISOCAP 924, 926 to facilitate transmission of data while facilitating protection between the transmitter 918, and the receivers 920, 922. As described above in conjunction with FIGS. 2A-5B, the isolation packages 200, 300, 400, 500, 600 are able to transmit data to any number of receivers using one ISOCAP, as opposed to the two ISOCAPs of the example isolation circuit 902. Accordingly, the isolation packages 200, 300, 400, 500, 600 are less complex, smaller, and cheaper to implement than the example isolation circuit 902.

While an example manner of implementing the example isolation packages 200, 300, 400, 500, 600, 700 of FIGS. 2A-6B is illustrated in FIGS. 2A-6B, one or more of the elements, processes and/or devices illustrated in FIGS. 2A-6B may be combined, divided, re-arranged, omitted, eliminated and/or implemented in any other way. Further, the example TX sequence controller 210, the example MUX 212, the example modulators 214, 216, the example ISOCAPs 220, 218, 704, 708, the example demodulators 228, 230, 232, 234, 236, 238, 408, 410, the example RX sequence controllers 240, 242, the example demultiplexers 246, 248, 250, and/or, more generally, the example isolation packages 200, 300, 400, 500, 600, 700 of FIGS. 2A-6B may be implemented by hardware, software, firmware and/or any combination of hardware, software and/or firmware. Thus, for example, any of the example TX sequence controller 210, the example MUX 212, the example modulators 214, 216, the example ISOCAPs 220, 218, 704, 708, the example demodulators 228, 230, 232, 234, 236, 238, 408, 410, the example RX sequence controllers 240, 242, the example demultiplexers 246, 248, 250, and/or, more generally, the example isolation packages 200, 300, 400, 500, 600, 700 of FIGS. 2A-6B could be implemented by one or more analog or digital circuit(s), logic circuits, programmable processor(s), programmable controller(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example TX sequence controller 210, the example MUX 212, the example modulators 214, 216, the example ISOCAPs 220, 218, 704, 708, the example demodulators 228, 230, 232, 234, 236, 238, 408, 410, the example RX sequence controllers 240, 242, the example demultiplexers 246, 248, 250, and/or, more generally, the example isolation packages 200, 300, 400, 500, 600, 700 of FIGS. 2A-6B is/are hereby expressly defined to include a non-transitory computer readable storage device or storage disk such as a memory, a digital versatile disk (DVD), a compact disk (CD), a Blu-ray disk, etc. including the software and/or firmware. Further still, the example isolation packages 200, 300, 400, 500, 600, 700 of FIGS. 2A-6B may include one or more elements, processes and/or devices in addition to, or instead of, those illustrated in FIGS. 2A-6B, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

From the foregoing, it will be appreciated that example methods, apparatus, and articles of manufacture facilitate multi-channel isolation. Examples disclosed herein utilize a multiplexer on the transmitter side of an isolation package to combine multiple data signals to be transmitted to multiple receivers into one data signal. In this manner, the one data signal can be transmitted to the multiple receivers via one isolation capacitor and demultiplex on the receiver side so that each receiver can obtain the data intended for it. In this manner, the number of isolation capacitors needed to transmit data from a transmitter to multiple receivers is reduced to one, regardless of the number of receivers, thereby reducing die area, the number of components, cost, and complexity of an isolation package.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a controller having a controller input and a controller output;
a multiplexer having a first multiplexer input, a second multiplexer input, a multiplexer select input, and a multiplexer output, the multiplexer select input coupled to the controller output;
a modulator having a modulator input and a modulator output, the modulator input coupled to the multiplexer output;
a capacitor having a first capacitor terminal and a second capacitor terminal, the first capacitor terminal coupled to the modulator output;
a first die coupled to the second capacitor terminal; and
a second die coupled to the second capacitor terminal.

2. The apparatus of claim 1, wherein the multiplexer, the modulator, and the capacitor are in a third die, the third die included in a package with the first die and the second die.

3. The apparatus of claim 1, wherein the multiplexer is in a third die and the modulator and the capacitor are included in a fourth die different than the third die, the third die and the fourth die in a package with the first die and the second die.

4. The apparatus of claim 1, wherein the multiplexer and the modulator are in a third die and the capacitor is in the first die, the second die coupled to the capacitor via a demodulator of the first die, the third die in a package with the first die and the second die.

5. The apparatus of claim 1, wherein the controller is a first controller, the controller input is a first controller input, and the controller output is a first controller output, the capacitor is a first capacitor, the first die comprising:
a demodulator having a demodulator input and a demodulator output, the demodulator input coupled to the capacitor;
a demultiplexer having a demultiplexer input and a demultiplexer select input, the demultiplexer input coupled to the demodulator output; and
a second controller having a second controller input and a second controller output, the second controller output coupled to the demultiplexer select input, the second controller input coupled to a clock terminal via a second capacitor, and the first controller input coupled to the clock terminal.

6. The apparatus of claim 5, wherein the demodulator is a first demodulator, the demodulator input is a first demodulator input, the demodulator output is a first demodulator output, the demultiplexer is a first demultiplexer, the demultiplexer input is a first demultiplexer input, the demultiplexer select input is a first demultiplexer select input, the second die comprising:
a second demodulator having a second demodulator input and a second demodulator output, the second demodulator input coupled to the first capacitor;
a second demultiplexer having a second demultiplexer input and a second demultiplexer select input, the demultiplexer input coupled to the second demodulator output; and
a third controller having a third controller input and a third controller output, the third controller output coupled to the second demultiplexer select input, the third controller output coupled to the clock terminal via the second capacitor.

7. The apparatus of claim 5, wherein the demultiplexer is a first demultiplexer, the demultiplexer input is a first demultiplexer input, the demultiplexer select input is a first demultiplexer select input, the second die comprising:
a second demultiplexer having a second demultiplexer input and a second demultiplexer select input, the second demultiplexer input coupled to the demodulator output; and
a third controller having a third controller input and a third controller output, the third controller output coupled to the second demultiplexer select input, the third controller input coupled to the clock terminal via the second capacitor.

8. The apparatus of claim 1, further comprising:
a demodulator having a demodulator input and a demodulator output, the demodulator input coupled to the second capacitor terminal; and
a demultiplexer having a demultiplexer input, a first demultiplexer output, and a second demultiplexer output, the demultiplexer input coupled to the demodulator output, the first die coupled to the second capacitor terminal via the first demultiplexer output, the second die coupled to the second capacitor terminal via the second demultiplexer output.

9. The apparatus of claim 8, wherein the multiplexer and the modulator are in a third die, and the capacitor, the demodulator, and the demultiplexer are in a fourth die, the third die and the fourth die in a package with the first die and the second die.

10. The apparatus of claim 1, wherein the capacitor is a first capacitor, the first die comprising a second capacitor, the second capacitor having a third capacitor terminal and a fourth capacitor terminal, the third capacitor terminal coupled to the second capacitor terminal, the second die coupled to the second capacitor terminal via the second capacitor terminal.

11. An apparatus comprising:
a multiplexer having a first multiplexer input, a second multiplexer input, a multiplexer select input, and a multiplexer output, the multiplexer configured to output a serial data signal at the multiplexer output based on a first data signal received at the first multiplexer input and based on a second data signal received at the second multiplexer input;
a modulator;
a capacitor coupled to the multiplexer output via the modulator;
at least one demodulator;
a first demultiplexer coupled to the capacitor via the at least one demodulator, the first demultiplexer configured to extract the first data signal from the serial data signal based on a control signal; and a second demultiplexer coupled to the capacitor via the at least one demodulator, the second demultiplexer configured to extract the second data signal from the serial data signal.

12. The apparatus of claim 11, wherein the at least one demodulator comprises a first demodulator coupled to the first demultiplexer and a second demodulator coupled to the second demultiplexer.

13. The apparatus of claim 11, wherein the control signal is a second control signal, the apparatus further comprising:
a first controller configured to output a first control signal to the multiplexer select input, the first control signal corresponding to a clock signal, the first control signal configured to instruct the multiplexer to produce the serial data signal; and
a second controller configured to output the second control signal corresponding to the clock signal, the second control signal corresponding to the first control signal.

14. The apparatus of claim 13, wherein the first demultiplexer has a first demultiplexer select input and the second demultiplexer has a second demultiplexer select input, the second controller is configured to output the second control signal to the first demultiplexer select input of the first demultiplexer, instructing the first demultiplexer to extract the first data signal from the serial data signal, the apparatus further comprising:
a third controller configured to output a third control signal to the second demultiplexer select input instructing the second demultiplexer to extract the second data signal from the serial data signal.

15. The apparatus of claim 14, wherein:
the first controller, the second controller, and the third controller are synchronized based on the clock signal; and
the first controller is configured to instruct the multiplexer to produce the serial data signal based on a sequence, the second controller configured to extract the first data signal from the serial data signal based on the sequence.

16. The apparatus of claim 11, wherein the modulator is configured to convert the serial data signal to a carrier signal and the at least one demodulator is configured to convert the carrier signal to the serial data signal.

17. A system comprising:
a high-voltage stage comprising a first high-voltage power switch having a first gate and a second high-voltage power switch having a second gate;
a low-voltage stage comprising a controller configured to transmit a first data signal to the first first gate and to transmit a second data signal to the second gate; and
an isolation package coupling the high-voltage stage and to the low-voltage stage, the isolation package comprising:
a multiplexer having a multiplexer output, the multiplexer configured to output a serial data signal at the multiplexer output based on the first data signal and the second data signal;
a capacitor coupled to the multiplexer output via a modulator;
a first demultiplexer configured to extract the first data signal from the serial data signal based on a first clock signal; and
a second demultiplexer configured to extract the second data signal from the serial data signal based on a second clock signal.

18. The system of claim 17, wherein the capacitor is configured to provide safety insulation capacity between the controller, the high-voltage stage, and the low-voltage stage.

19. The system of claim 17, further comprising a motor, the controller configured to control the motor via the isolation package.

20. The system of claim 17, wherein the multiplexer has a multiplexer select input, the system further comprising:
a first controller configured to output the first clock signal to the multiplexer select input, the multiplexer configured to produce the serial data signal responsive to the first clock signal; and
a second controller configured to output the second clock signal corresponding to the first clock signal.

* * * * *